(12) United States Patent  
Szeto

(10) Patent No.: US 10,107,646 B2
(45) Date of Patent: Oct. 23, 2018

(54) ORIENTATION SENSOR

(71) Applicant: Nanoport Technology Inc., Markham (CA)

(72) Inventor: Timothy Jing Yin Szeto, Markham (CA)

(73) Assignee: NANOPORT TECHNOLOGY INC., Markham (CA)

( * ) Notice: Subject to any disclaimer, the term of this patent is extended or adjusted under 35 U.S.C. 154(b) by 223 days.

(21) Appl. No.: 15/136,313

(22) Filed: Apr. 22, 2016

(65) Prior Publication Data

US 2017/0138763 A1    May 18, 2017

Related U.S. Application Data

(60) Provisional application No. 62/257,138, filed on Nov. 18, 2015.

(51) Int. Cl.
| | |
|---|---|
| *G01B 7/14* | (2006.01) |
| *G01B 7/30* | (2006.01) |
| *G01R 33/06* | (2006.01) |
| *H01L 43/06* | (2006.01) |
| *G01D 5/14* | (2006.01) |
| *G01D 5/165* | (2006.01) |
| *H04W 4/00* | (2018.01) |
| *H04W 4/80* | (2018.01) |

(52) U.S. Cl.
CPC .............. *G01D 5/145* (2013.01); *G01D 5/165* (2013.01); *H04W 4/008* (2013.01); *H04W 4/80* (2018.02)

(58) Field of Classification Search
CPC ............ G01D 5/06; G01D 5/125; G01D 5/14; G01D 5/142; G01D 5/145; G01D 5/147; G01D 5/165; G01D 5/1655; H01R 13/22; H01R 13/6205; H04W 4/008; H04W 4/80
USPC .............. 324/207.2, 207.21, 207.22, 207.24, 324/207.26; 439/38, 39, 40
See application file for complete search history.

(56) References Cited

U.S. PATENT DOCUMENTS

| | | | |
|---|---|---|---|
| 4,899,132 A | 2/1990 | Stobbe et al. | |
| 7,880,598 B2 | 2/2011 | Ciccaglione et al. | |
| 8,498,100 B1 | 7/2013 | Whitt, III et al. | |
| 2007/0072443 A1 | 3/2007 | Rohrbach et al. | |
| 2010/0197148 A1* | 8/2010 | Rudisill | H01R 11/30 439/40 |
| 2014/0035517 A1 | 2/2014 | Dunko | |
| 2014/0170864 A1* | 6/2014 | Hwang | H01R 13/6205 439/38 |

FOREIGN PATENT DOCUMENTS

| | | |
|---|---|---|
| WO | 2014087164 A | 6/2014 |
| WO | 2015070321 A1 | 5/2015 |

* cited by examiner

*Primary Examiner* — Jeff Natalini
*Assistant Examiner* — Steven Yeninas
(74) *Attorney, Agent, or Firm* — Ridout & Maybee LLP

(57) ABSTRACT

An orientation sensor includes a sensor housing, a sensor actuator, and a motion sensor. The sensor housing has a cavity disposed therein. The sensor actuator is disposed within the housing and is configured for movement within the cavity in a direction that is influenced by a magnetic field between the sensor actuator and an electronic device external to the orientation sensor. The motion sensor is disposed within the housing and configured to detect the direction of movement of the sensor actuator within the cavity.

21 Claims, 15 Drawing Sheets

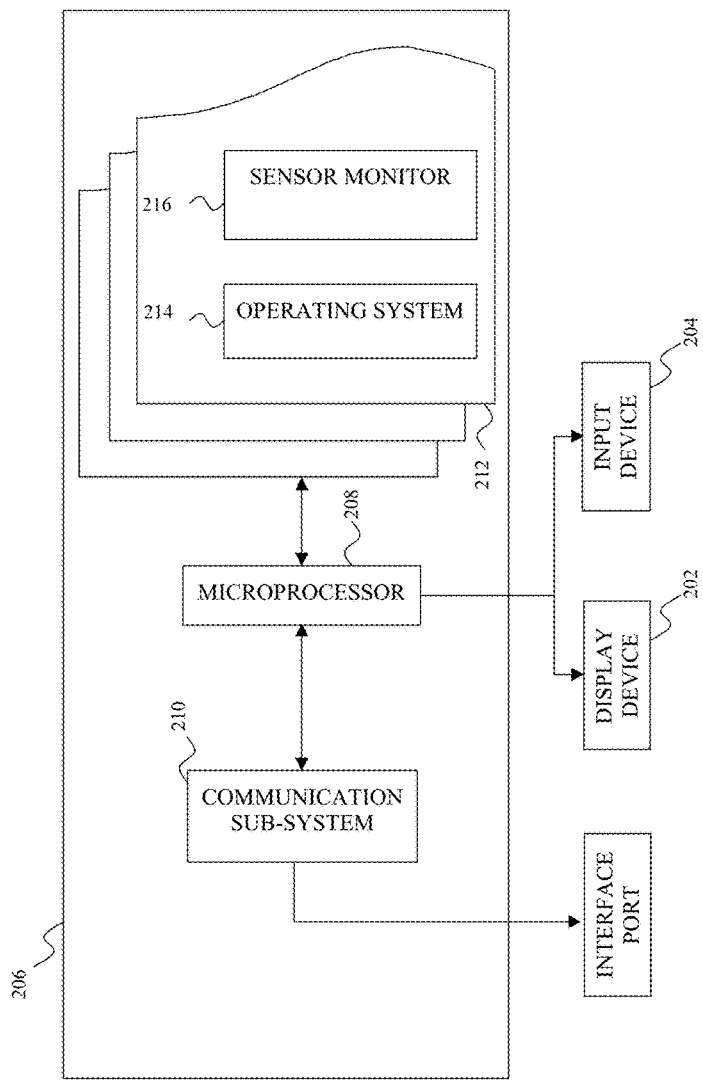

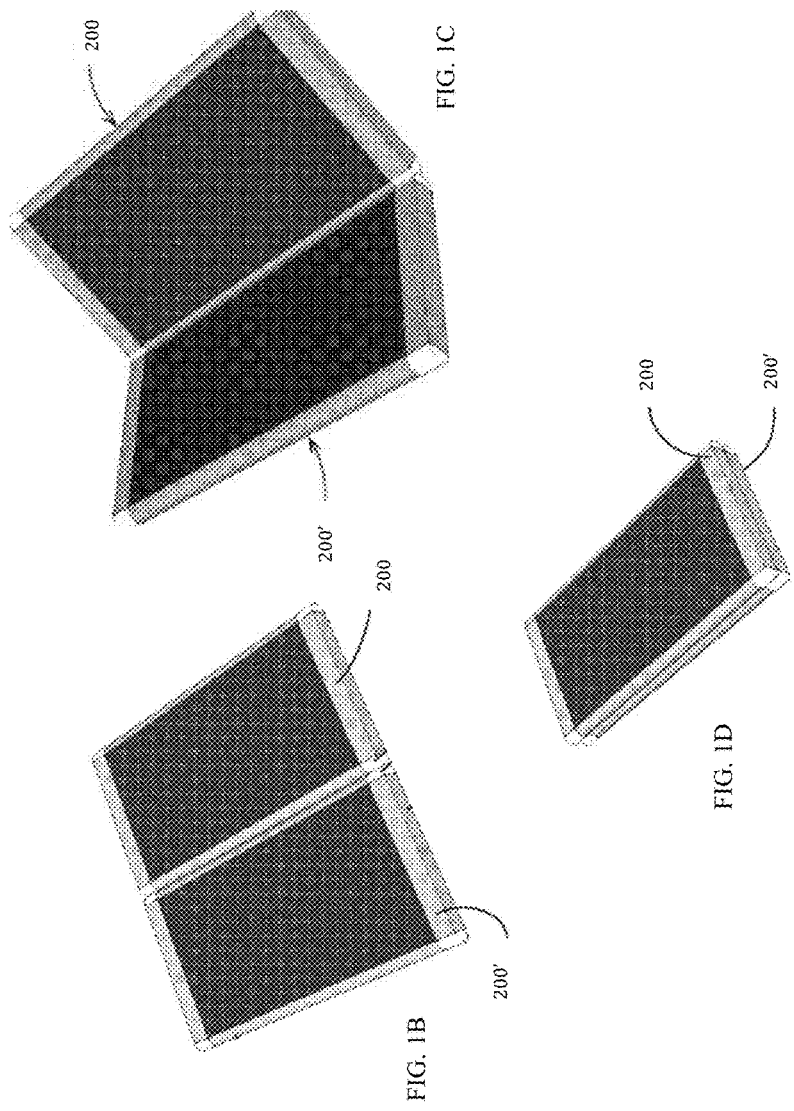

ORIENTATION SENSOR

CROSS-REFERENCE TO RELATED APPLICATIONS

This patent application claims the benefit of the filing date of U.S. provisional patent application No. 62/257,138, filed Nov. 18, 2015, entitled "Orientation Sensor", the contents of which are incorporated herein by reference.

FIELD OF THE INVENTION

This patent application relates to electronic devices having at least one detachable electronic component.

BACKGROUND

Electronic devices (e.g. mobile phones, tablet computers, laptop computers) are usually provided with a multitude of connection options that allow the devices to interface with other mobile computing devices and/or peripheral devices (e.g. displays, headsets, keyboards, pointing devices).

It may be advantageous to allow electronic devices to detect the orientation of such other electronic devices as they are brought in proximity to the electronic device, and thereby provide functionality based on the relative orientation of the devices.

SUMMARY

This patent application describes an orientation sensor, an interface port for a computing device that determines an orientation of an electronic device relative to the interface port, and a computing device that determines an orientation of an electronic device relative to the computing device.

In accordance with a first aspect of the disclosure, the orientation sensor includes a sensor housing, a sensor actuator, and a motion sensor. The sensor housing has a cavity disposed therein.

The sensor actuator is disposed within the housing and is configured for movement within the cavity in a direction that is influenced by a magnetic field that extends between the sensor actuator and an electronic device that is external to the orientation sensor. The motion sensor is configured to detect the direction of movement of the sensor actuator within the cavity.

The cavity may be configured to restrict the movement of the sensor actuator to a single plane. Alternately, the cavity may be configured to allow for the movement of the sensor actuator in two orthogonal planes. In this latter variation, preferably the motion sensor is configured to detect the direction of movement of the sensor actuator within each of the two orthogonal planes.

In one implementation, the motion sensor includes a pair of opposed flexible sensor strips, and the sensor actuator Is configured to impinge against one of the sensor strips upon the influence of the magnetic field and to vary an impedance between the sensor strips upon the impinging (the impedance varying being localized to a location of the impinging of the sensor actuator). The pair of opposed sensor strips may include a plurality of sensor faces each extending along a respective plane about the cavity.

In another implementation, the motion sensor includes a plurality of piezo-resistive and/or piezo-electric sensors that are disposed at respective locations within the cavity, the sensor actuator Is configured to impinge against at least one of the sensors upon the influence of the magnetic field, and the at least one sensor is configured to output a signal indicating a force exerted against the at least one sensor by the impinging.

In another implementation, the motion sensor includes a plurality of Hall effect sensors that are disposed at respective locations within the cavity, the sensor actuator is configured to move relative to at least one of the Hall effect sensors upon the influence of the magnetic field, and the at least one Hall effect sensor is configured to output a signal indicating the movement of the sensor actuator.

In accordance with a second aspect of the disclosure, the interface port includes a port housing, a contact assembly, a sensor actuator, and a motion sensor. The port housing includes centre and side channels disposed therein.

The contact assembly is disposed in the housing and is moveable within the centre channel by a magnetic field that extends between the interface port and an electronic device that is external to the interface port. The contact assembly is moveable within the centre channel between a retracted position in which the contact assembly is electrically isolated from the electronic device, and an extended position in which the contact assembly is urged via the magnetic field into electrical contact with the electronic device.

The sensor actuator is disposed within the housing and is moveable within the side channel by the magnetic field that extends between the interface port and the external electronic device. The sensor actuator is moveable within the side channel between a locked position in which the sensor actuator magnetically retains the contact assembly in the retracted position, and an unlocked position in which the sensor actuator is urged via the magnetic field away from the contact assembly, and releases the contact assembly from the retracted position.

The motion sensor is configured to detect the orientation of the external electronic device relative to the interface port from the orientation of the magnetic field relative to the interface port. The motion sensor is configured to detect the orientation of the magnetic field from the direction of movement of one of the contact assembly and the lock member within the respective channel.

The side channel may be configured such that the contact assembly and the sensor actuator magnetically urge one another respectively into the retracted position and the locked position. The sensor actuator may be configured to rotate within the side channel as the sensor actuator moves between the locked position and the unlocked position.

As discussed above, the side channel may be configured to restrict the movement of the sensor actuator to a single plane. Alternately, the side channel may be configured to allow for the movement of the sensor actuator in two orthogonal planes. In this latter variation, preferably the motion sensor is configured to detect the direction of movement of the sensor actuator within each of the two orthogonal planes.

As discussed above, in one implementation, the motion sensor comprises a pair of opposed flexible sensor strips, and the sensor actuator Is configured to impinge against one of the sensor strips upon the influence of the magnetic field and to vary an impedance between the sensor strips upon the impinging (the impedance varying being localized to a location of the impinging). The pair of opposed sensor strips may include a plurality of sensor faces each extending along a respective plane about the side channel.

In accordance with a third aspect of the disclosure, the interface port includes a port housing, a contact assembly, a sensor actuator, and a motion sensor. The port housing includes a channel disposed therein. The sensor actuator is disposed in the port housing and is configured for movement within the channel in response to a magnetic field between the sensor actuator and an electronic device external to the interface port. The contact assembly is disposed in the port housing, but is fixed in a position therein in which the contact assembly is exposed for electrical contact with the external electronic device. The motion sensor is configured to detect the movement of the sensor actuator within the channel.

In accordance with a fourth aspect of the disclosure, the computing device includes a housing, a sensor actuator, a motion sensor, and a sensor monitor. The device housing has a cavity disposed therein.

The sensor actuator is disposed within the housing and is configured for movement within the cavity in a direction that is influenced by a magnetic field that extends between the sensor actuator and an electronic device that is external to the computing device. The motion sensor is disposed within the housing and is configured to detect the direction of movement of the sensor actuator within the cavity. The sensor monitor is coupled to the motion sensor and is configured to determine an orientation of the electronic device relative to the device housing from the detected direction of movement of the sensor actuator.

As discussed above, the cavity may be configured to allow for the movement of the sensor actuator in two orthogonal planes. In this latter variation, preferably the motion sensor is configured to detect the direction of movement of the sensor actuator within each of the two orthogonal planes.

As discussed above, in one implementation the motion sensor comprises a pair of opposed flexible sensor strips, and the sensor actuator Is configured to impinge against one of the sensor strips upon the influence of the magnetic field and to vary an impedance between the sensor strips upon the impinging (the impedance varying being localized to a location of the impinging). In this implementation, the sensor monitor is configured to determine the orientation of the electronic device from a location of the localized impedance varying. The pair of opposed sensor strips may include a plurality of sensor faces each extending along a respective plane about the cavity.

As discussed above, in another implementation the motion sensor comprises a plurality of piezo-resistive and/or piezo-electric sensors that are disposed at respective locations within the cavity, the sensor actuator Is configured to impinge against one of the sensors upon the influence of the magnetic field, at least one of the sensors is configured to detect a force exerted against the at least one sensor by the impinging, and the sensor monitor is configured to determine the orientation of the electronic device from an output of the at least one sensor.

In another implementation, the motion sensor comprises a plurality of Hall effect sensors that are disposed at respective locations within the cavity, the sensor actuator is configured to move relative to one of the Hall effect sensors upon the influence of the magnetic field, the at least one Hall effect sensor is configured to detect the movement of the sensor actuator, and the sensor monitor is configured to determine the orientation of the electronic device from an output of the at least one Hall effect sensor.

In accordance with a fifth aspect of the disclosure, the computing device includes a housing, a sensor actuator, a contact assembly, a motion sensor, and a sensor monitor. The device housing has a channel disposed therein. The sensor actuator is disposed in the channel, and is configured for movement within the channel in response to a magnetic field between the sensor actuator and an electronic device external to the computing device.

The contact assembly is disposed in the housing, but is fixed in a position therein in which the contact assembly is exposed for electrical contact with the external electronic device. The motion sensor is configured to detect the movement of the sensor actuator within the channel. The sensor monitor is coupled to the motion sensor, and is configured to detect a presence of the external electronic device proximate the computing device from the movement of the sensor actuator.

BRIEF DESCRIPTION OF THE DRAWINGS

Exemplary orientation sensors, computing device interface ports, and computing devices will now be described, with reference to the accompanying drawings, in which:

FIG. 1A is a schematic view of a computing device incorporating an interface port having an embedded orientation sensor;

FIGS. 1B, 1C, 1D depict three possible orientations that an external electronic device may have relative to the computing device;

DETAILED DESCRIPTION

Computing Device

Figure 2A:
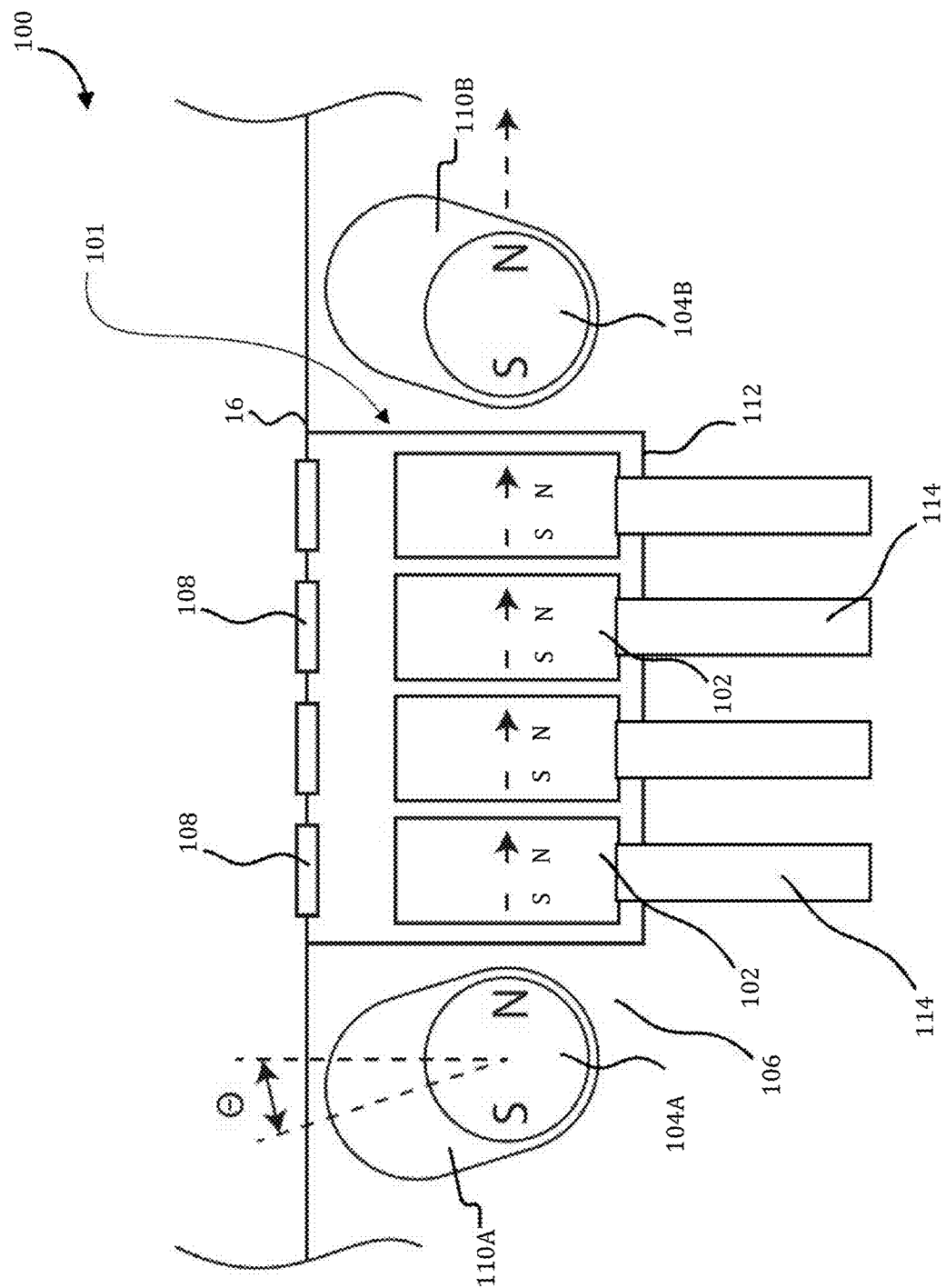
FIG. 2A is a schematic view of the interface port in a retracted position.

FIG. 1A is a schematic view of a computing device, denoted generally as 200. The computing device 200 is not limited to any particular form factor, and may be configured as a variety of computing devices, including smartphones, tablet computers, laptop computers, desktop computers, workstations, servers, portable computers, personal digital assistants, interactive televisions, video display terminals, gaming consoles, electronic reading devices, any other portable electronic device, or a combination of these. The computing device 200 may be portable, or may be integrated with a household appliance (e.g., a fridge, oven, washing machine, stereo, exercise bike, alarm clock, or the like), or an automobile (e.g., on a vehicle dashboard).

As shown, the computing device 200 includes at least one interface port, a display 202, a user input device 204, and a data processing system 206, all mounted to or disposed within a common device housing. The interface ports may be disposed at one or more corners of the device housing, along one or more sides of the device housing, and/or on the front and/or rear faces of the device housing, and physically interface the computing device 200 with communications networks, peripheral devices (e.g. displays, headsets, keyboards, pointing devices) and/or other computing devices 200.

The user input device 204 may be provided as a keyboard, a biometric input device (e.g. microphone) and/or a touch-sensitive layer provided on the display 202. The data processing system 206 comprises a microprocessor 208 and a tangible non-transient computer-readable medium 210, and may also include a communication sub-system 212.

The computer-readable medium 210 typically comprises non-volatile electronic computer memory that stores computer processing instructions which, when accessed from the memory 210 and executed by the microprocessor 208, implement an operating system 214 and may also implement a sensor monitor 216. The operating system 214 is configured to display output on the display 202, to receive user input from the input device 204, and to send and receive communication signals via the communication sub-system 210.

The operation of the sensor monitor 216 will be discussed in greater detail below. However, it is sufficient at this point to note that the sensor monitor 216 may be configured to determine an orientation, relative to the computing device 200, of an electronic device that is external to the device housing. FIGS. 1B-1D depict three possible orientations that an external electronic device (e.g. another computing device 200') may have relative to the computing device 200, although the scope of possible orientations detected is not limited to those depicted therein. Alternately, the sensor monitor 216 may be configured to detect the presence of an electronic device proximate the device housing. Although the sensor monitor 216 is typically implemented as computer processing instructions, all or a portion of the functionality of the sensor monitor 216 may be implemented instead in electronics hardware, such as a field programmable logic gate array (FPGA) or a complex programmable logic device (CPLD). Further, as will be explained, the sensor monitor 216 may be implemented instead in one or more of the interface ports.

The communication sub-system 212 allows the computing device 200 to communicate with local area networks and/or wide area networks. The networks may be configured as wired networks, optical networks, WiFi networks, NFC networks, Bluetooth networks, cellular networks, or a combination thereof. Accordingly, the communication sub-system 212 allows the computing device 200 to transmit and receive wireless communications signals over wired, optical, WiFi, NFC, Bluetooth and/or cellular networks.

Each interface port is connected to the communication sub-system 212, and may thereby physically and electrically interface the communication sub-system 210 with the wired local and/or wide area networks. Additionally, or alternately, the interface port may physically and electrically interface the communication sub-system 210 with one or more peripheral devices and/or other computing devices 200 (collectively referred to hereinafter as "electronic devices").

Interface Port with 2D Orientation Detection

An example interface port 100 is shown in FIGS. 2A-2G. In this embodiment, the interface port 100 includes a port housing 106, and a contact assembly 101, one or more lock members 104, and one or more motion sensors 150 all disposed within the port housing 106. The port housing 106 is typically disposed within the device housing of the computing device 200, and is formed from materials that are insulating and are readily shaped, such as, e.g., polybutylene terephthalate (PBT), polyethylene terephthalate (PET), or the like. However, in one variation, the interface port 100 is manufactured without the port housing 106, in which case the contact assembly 101, the sensor actuator(s), and the motion sensor(s) 150 may be disposed directly in the device housing.

The port/device housing includes a centre channel 112, and at least one side channel that is distinct from the centre channel 112. In the embodiment shown, the port/device housing includes a first side channel 110A, and a second side channel 110B that is distinct from the first side channel 110A and has a similar shape to that of the first side channel 110A. Further, the first side channel 110A is disposed proximate one side of the centre channel 112, and the second side channel 110B is disposed proximate the opposite side of the centre channel 112, such that the centre channel 112 is disposed between the first and second side channels 110A, 110B. However, in one variation, the port/device housing is manufactured with only a single side channel 110, in which case the side channel 110 may be disposed on either side of the centre channel 112.

Figure 2B:
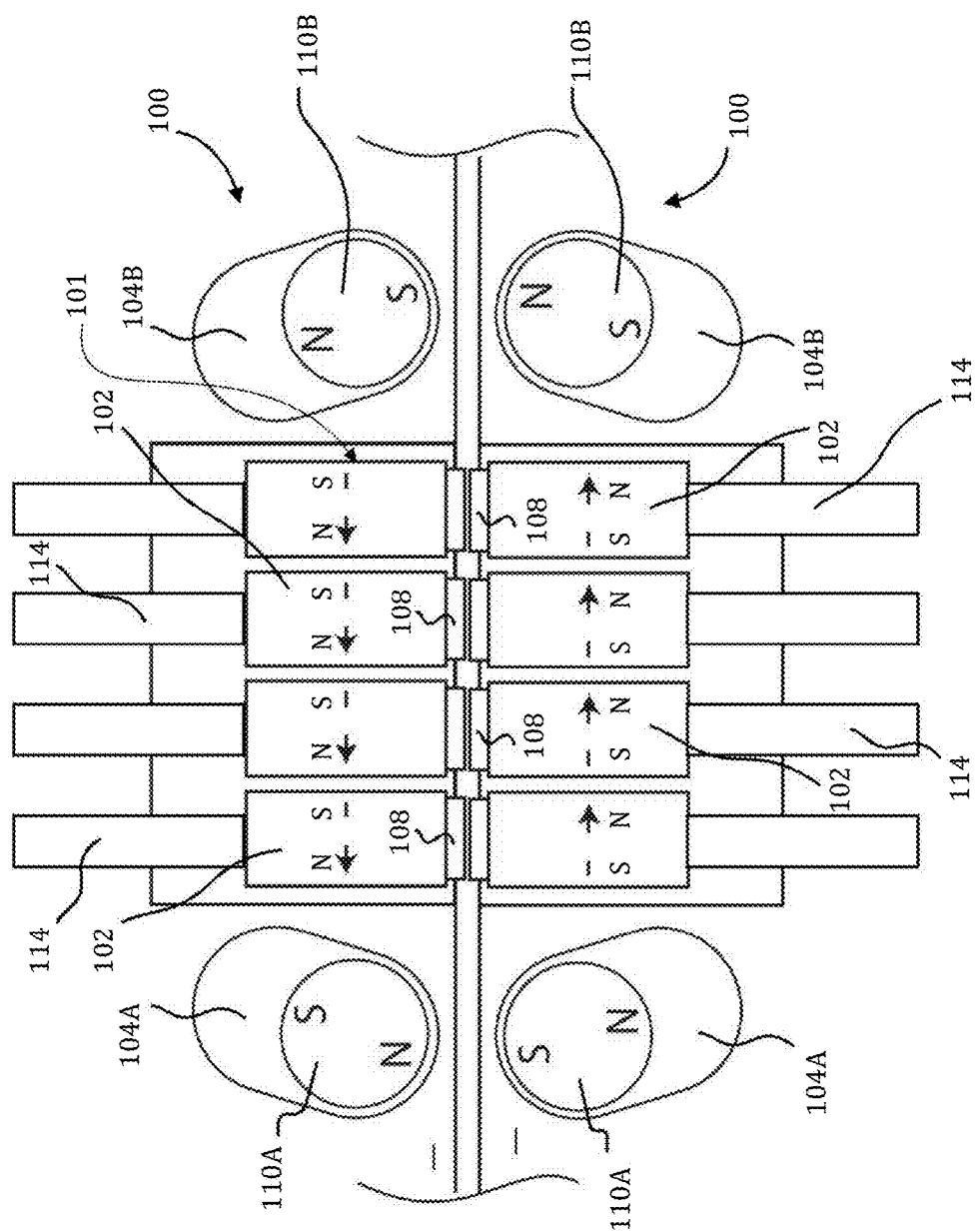
FIG. 2B is a schematic view of the interface port in an extended position.

The contact assembly 101 is moveable within the centre channel 112 by a magnetic field that may be established between the interface port 100 and an electronic device that is external to the interface port 100. As will be explained, the contact assembly 101 is moveable within the centre channel 112 between a retracted position (as shown in FIG. 2A) in which the contact assembly 101 is electrically isolated from the external electronic device, and an extended position (as shown in FIG. 2B) in which the contact assembly 101 is urged via the magnetic field into electrical contact with the external electronic device. In the example shown in FIG. 2B, the external electronic device is another computing device 200. However, as discussed, the external electronic device may be other devices, such as peripheral devices.

In the embodiment of FIGS. 2A-2G, the interface port 100 includes both the first side channel 110A and the second side channel 110B. In this embodiment, the first side channel 110A retains a first lock member 104A and a first side motion sensor 150 therein, and the second side channel 110B retains a second lock member 104B and a second side motion sensor 150 therein (see FIG. 2F for a sample motion sensor 150 isolated from the side channels 110). However, as discussed, the interface port 100 may be manufactured with only a single side channel 110, in which case the interface port 100 would not include the second lock member 104B or the second side motion sensor 150. Alternately, as will be discussed, a centre motion sensor 150 may be disposed in the centre channel 112, either instead of, or in addition to the side motion sensors 150 that may be disposed in the side channels 110A, 110B.

The first and side channels 110A, 110B each define a pathway that extends inwardly from an exterior face 16 of the port/device housing and towards a respective side of the centre channel 112. As shown, the first side channel 110A is oriented at an orientation angle θ away from the normal line of the exterior face 16 of the port/device housing, while the second side channel 110B is oriented at an opposite angle. Each of side channels 110A and 110B has a first end that is proximate the centre channel 112 and distal the exterior face 16 of the port/device housing, and a second end that is proximate the exterior face 16 of the port/device housing.

The first lock member 104A may be urged to slide within the first side channel 110A by the magnetic field that may be established between the interface port 100 and the external electronic device, and is moveable within the first side channel 110A in a direction that is influenced by the orientation of the magnetic field relative to the port/device, and the orientation angle θ of the first side channel 110A. As will be explained, the first lock member 104A is slidably moveable within the first side channel 110A between a locked position (as shown in FIG. 2A) in which the first lock member 104A magnetically retains the contact assembly 101 in the retracted position, and an unlocked position (as shown in FIG. 2B) in which the first lock member 104A is urged via the magnetic field towards the external electronic device and laterally away from the contact assembly 101 and thereby releases the contact assembly 101 from the retracted position.

Similarly, the second lock member 104B (if provided) may be urged to slide within the second side channel 110B (if provided) by the magnetic field that may be established between the interface port 100 and the external electronic device, and is moveable within the second side channel 110B in a direction that is influenced by the orientation of the magnetic field relative to the port/device, and the orientation angle θ of the second side channel 110B. The second lock member 104B is slidably moveable within the second side channel 110B between a locked position (as shown in FIG. 2A) in which the second lock member 104B magnetically retains (in cooperation with the first lock member 104A) the contact assembly 101 in the retracted position, and an unlocked position (as shown in FIG. 2B) in which the second lock member 104B is urged via the magnetic field laterally away from the contact assembly 101 and thereby releases (in cooperation with the first lock member 104A) the contact assembly 101 from the retracted position.

As will be discussed, the first side motion sensor 150 may be configured to detect the direction of movement of the first lock member 104A within the first side channel 110A. Similarly, the second side motion sensor 150 (if provided) may be configured to detect the direction of movement of the second lock member 104B within the second side channel 110B. Alternately, where the interface port 100 includes a centre motion sensor 150 disposed in the centre channel 112, the centre motion sensor 150 may be configured to detect the direction of movement of the contact assembly 101 within the centre channel 112.

Figure 2C:
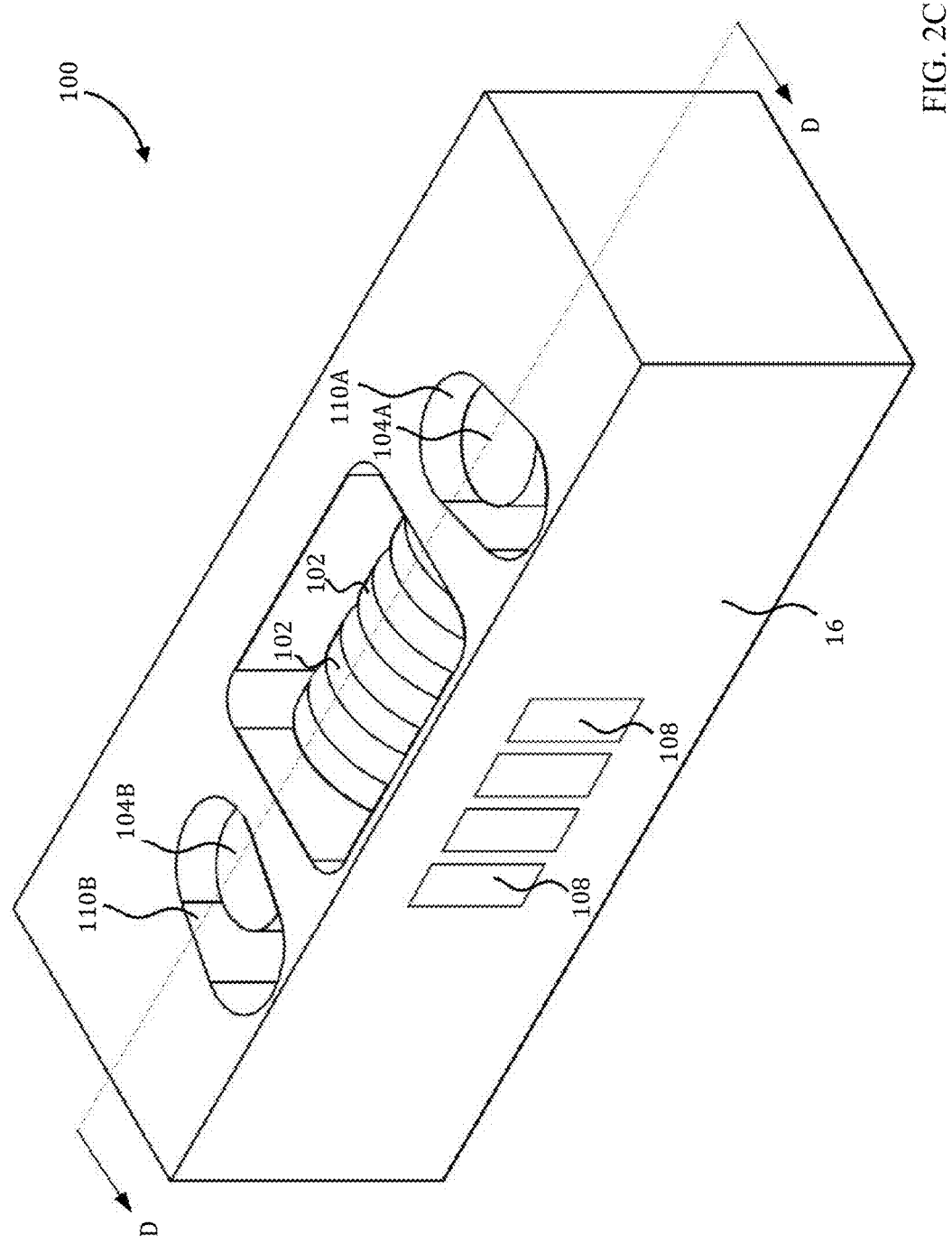
FIG. 2C is a perspective view of the interface port.
Figure 2D:
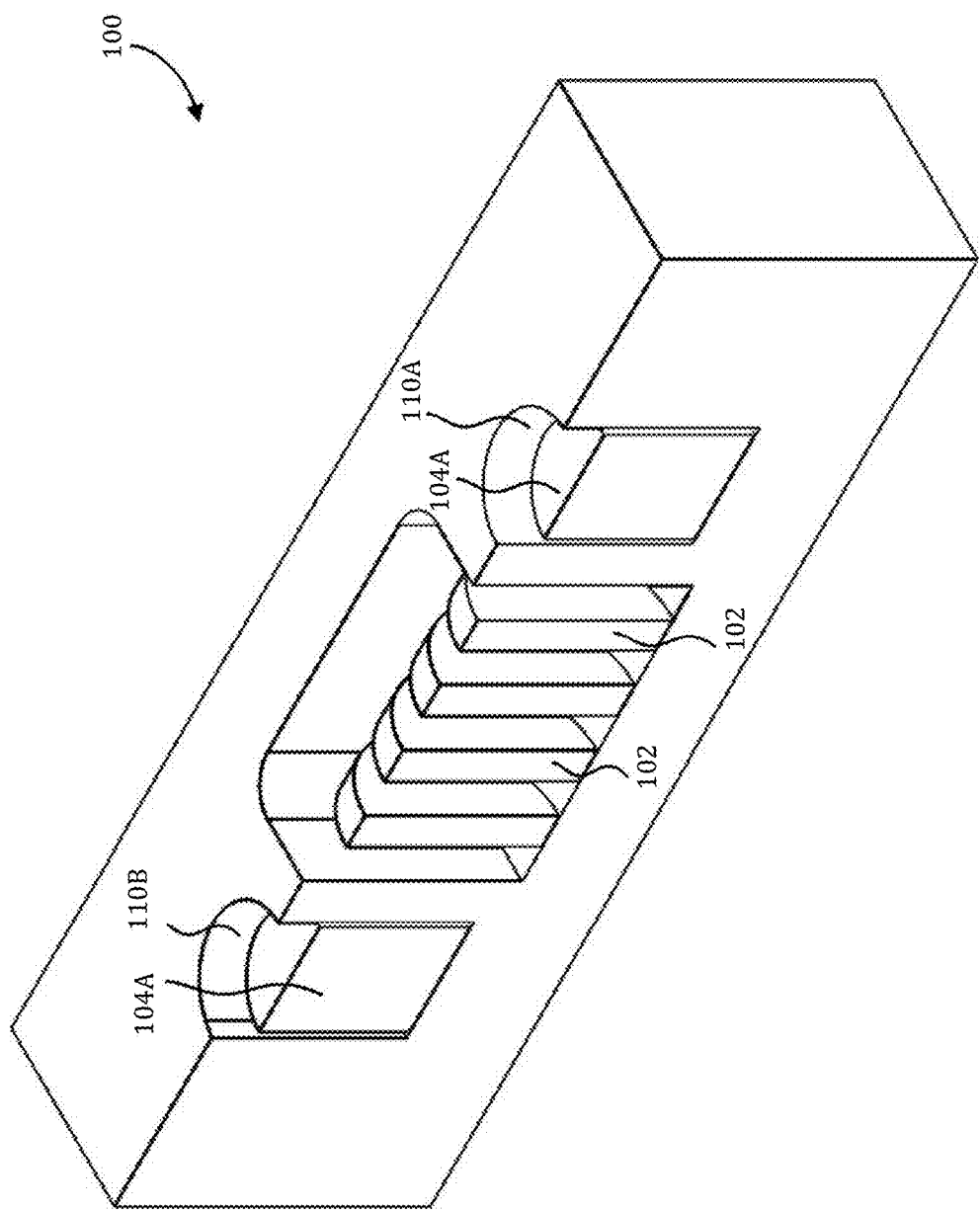
FIG. 2D is a perspective cross-sectional view of the interface port depicted in FIG. 2C.

The contact assembly 101 may comprise a plurality of permanent magnets 102 (referred to herein as "core magnets"), and a plurality of leads 114 secured to the core magnets 102 and electrically connected to the communication sub-system 212. As shown in FIGS. 2C, 2D, each core magnet 102 may have a disc shape. However, the shape of the core magnet 102 is not so limited. For example, the core magnets 102 may have a bar shape. Further, although the contact assembly 101 is shown comprising four (4) core magnet 102, the number of core magnets 102 is not so limited.

Preferably, the core magnets 102 are made from rare earth materials, such as Neodymium-Iron-Boron (NdFeB), and Samarium-cobalt. The core magnets 102 may also be made from iron, nickel or other suitable alloys. Alternately, the contact assembly 101 may be made from passive (e.g. metallic or ferromagnetic) magnetic materials.

As shown in FIG. 2C, the interface port 100 also includes a plurality of external electrical terminals 108 that are mounted to the external face 16 of the port/device housing for electrically connecting to electrical contacts of an electronic device that is external to the housing (such as another interface port 100). The external electrical terminals 108 may be formed from any suitable electrically conductive (e.g., metallic) material. Further, although the contact assembly 101 is shown comprising four (4) external electrical terminals 108, the number of external electrical terminals 108 is not so limited.

In the embodiment shown in FIGS. 2A, 2B, each lead 114 of the contact assembly 101 is secured to a respective one of the core magnets 102, and each core magnet 102 is aligned with a respective external electrical terminal 108. However, the invention is not so limited. The contact assembly 101 may have a plurality of leads 114 secured to each core magnet 102. Further, each core magnet 102 may be aligned with a plurality of external electrical terminals 108.

Figure 2E:
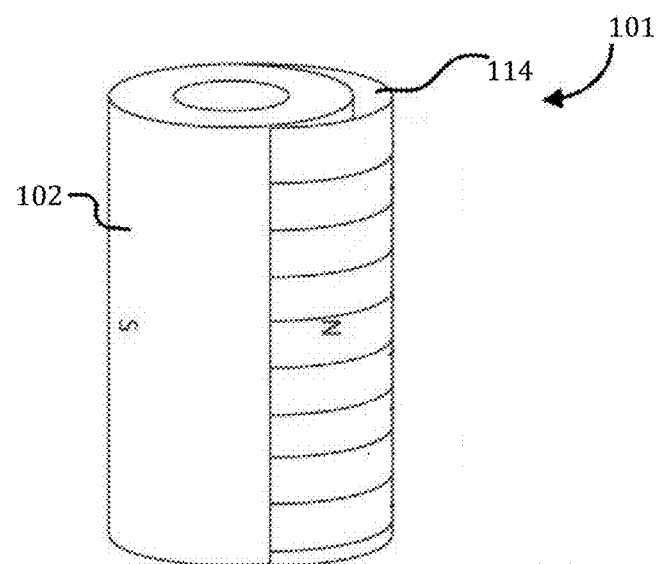
FIG. 2E is a side view of a contact assembly of the interface port.

As shown in FIG. 2E, the leads 114 may be secured to the outward-facing side of the core magnets 102, facing the external electrical terminals 108, and exposed for electrical contact with the associated external electrical terminals 108. In this implementation, preferably the leads 114 are electrically insulated from the core magnets 102, for example, by an insulative sleeve or coating (not shown) applied to the leads 114 and/or the core magnets 102. Alternatively, the leads 114 may be in electrical contact with the core magnets 102. In this latter implementation, the core magnets 102 are signal carriers and, therefore, preferably the contact assembly 101 includes insulating elements (not shown), for example, nylon spacers, disposed between the core magnets/magnetic materials 102 to electrically insulate the core magnets/magnetic materials 102 from one another.

As discussed, the contact assembly 101 is moveable within the centre channel 112 between a retracted position (as shown in FIG. 2A) in which the contact assembly 101 is electrically isolated from the external electronic device, and an extended position (as shown in FIG. 2B) in which the contact assembly 101 is urged via the magnetic field (between the interface port 100 and the external electronic device) into electrical contact with the external electronic device. Each lead 114, and associated core magnet/magnetic material 102, is aligned with a respective one of the external electrical terminals 108. Accordingly, when the core magnets/magnetic materials 102 of the contact assembly 101 are disposed in the retracted position, the core magnets/magnetic materials 102 are spaced inwardly from the external electrical terminals 108, and each lead 114 is thereby electrically isolated from the associated external electrical terminal 108 (and the corresponding terminal of the external electronic device). Conversely, when the core magnets/magnetic materials 102 are urged by the (first) magnetic field into the extended position, the core magnets/magnetic materials 102 abut the external electrical terminals 108, and each lead 114 thereby electrically connects to the associated external electrical terminal 108 (and the corresponding terminal of the external electronic device).

As shown, in both the retracted and extended positions, the core magnets 102 share a common magnetic orientation, namely, an orientation that provides a north-south magnetic field alignment that is parallel to the external face 16 of port/device housing. In this orientation, the north pole of each core magnet 102 is adjacent the south pole of the adjacent core magnet 102. Further, in this orientation, each core magnet 102 presents both north and south poles to the associated external electrical terminal 108.

The lock members 104A, 104B may comprise permanent magnets (referred to herein as "side magnets") that are rotatably moveable within their respective side channels 110A, 110B as the lock members 104A, 104B move between the locked position and the unlocked position. Preferably, the side magnets 104A, 104B are made from rare earth materials, such as Neodymium-Iron-Boron (NdFeB), and Samarium-cobalt. The lock members 104A, 104B may also be made from iron, nickel or other suitable alloys. Alternately, the lock members 104A, 104B may be made from passive (e.g. metallic or ferromagnetic) magnetic materials.

When the lock members 104A, 104B are disposed in the locked position (see FIG. 2A), the lock members 104A, 104B are each retained at the first end of their respective side channels 110A, 110B, proximate the sides of the centre channel 112. Where the lock members 104 comprise magnets, in the locked position the side magnets 104A, 104B have a first magnetic orientation in which the north-south magnetic field alignment of the side magnets 104A, 104B is parallel to the exterior face 16 of the port/device housing. With this first magnetic orientation, and the close proximity of the side magnets 104A, 104B to the contact assembly 101, the magnetic field strength between the side magnets 104A, 104B and the contact assembly 101 is sufficient to maintain the contact assembly 101 in the retracted position. The magnetic field may be sufficiently strong to prevent the interface port 100 of an external electronic device from withdrawing the contact assembly 101 from the retracted position, at least until the external electronic device is brought in close proximity to the interface port 100.

Conversely, when the lock members 104A, 104B are disposed in the unlocked position (see FIG. 2B), the lock members 104A, 104B are each retained at the second end of their respective side channels 110A, 110B, proximate the external face 16 of port/device housing. When the lock members comprise magnets, in the unlocked position the side magnets 104A, 104B have a second magnetic orientation in which the north-south magnetic field alignment of the side magnets 104A, 104B is at an acute angle to the exterior face 16 of the port/device housing. With this second magnetic orientation, and the increased distance between the side magnets 104A, 104B and the contact assembly 101, the magnetic field strength between the side magnets 104A, 104B and the contact assembly 101 is insufficient to maintain the contact assembly 101 in the retracted position.

To facilitate the rotation of the side magnets 104A, 104B between the first and second magnetic orientations, the side magnets 104A, 104B may have a cylindrical shape, and the side channels 110A, 110B may be shaped to allow each side magnet 104a, 104B to rotate about its respective cylindrical axis as each side magnet 104a, 104B slides between the locked and unlocked positions. Alternately, the side magnets 104A, 104B may have a shape other than cylindrical, such as spherical, a hemispherical, or ovoid.

As shown in FIG. 2B, when an external electronic device (for example the interface port 100 of another computing device 200) is brought into close proximity to the external face 16 of the interface port 100, a magnetic field is established between the external electronic device and the core magnets 102, and between the external electronic device and the lock members 104. The magnetic field urges the contact assembly 101 to slide in the centre channel 112, towards the external face 16 of port/device housing. The magnetic field also urges the lock members 104A, 104B to slide, in their respective side channels 110A, 110B, towards the external face 16 of port/device housing and the second end of their respective side channels 110A, 110B, and laterally away from their respective sides of the contact assembly 101 due to the orientation angle θ of the side channels 110A, 110B.

If the strength of the magnetic field established between the lock members 104A, 104B and the external electronic device is sufficient to overcome the magnetic field established between the lock members 104A, 104B and the contact assembly 101, the lock members 104A, 104B will begin to slide towards the second end of their respective side channels 110A, 110B and laterally away from the their respective sides of the contact assembly 101. To facilitate this movement, the distance between the lock members 104A, 104B may be at least the distance between the lock members 104 and the external face 16 of port/device housing when the lock members 104 are disposed in the locked position. Suitable sizes, orientations and spacing of the side channels 110A, 110B depend on the strengths of side magnets 104A, 104B and will be apparent to skilled persons based on the present disclosure.

Where the lock members 104 comprise magnets, as the side magnets 104A, 104B lide towards the second end of their respective side channels 110A, 110B and laterally away from the their respective sides of the contact assembly 101, the side magnets 104A, 104B also rotate about their respective rotational axes into the second magnetic orientation, thereby weakening the magnetic field between the side magnets 104A, 104B and the contact assembly 101 until the magnetic field strength between the side magnets 104A, 104B and the contact assembly 101 is insufficient to maintain the contact assembly 101 in the retracted position. As a result, the magnetic field established between the core magnets 102 and the external electronic device causes the contact assembly 101 to slide, in the centre channel 112, towards the external electronic device, and maintains the contact assembly 101 in the extended position in which the contact assembly 101 is in electrical contact with the external electronic device via the external electrical terminals 108.

Similarly, the magnetic field established between the lock members 104 and the external electronic device maintain the lock members 104 in the unlocked position (in which the lock members 104A, 104B are proximate the first end of their respective side channels 110A, 110B). As a result, the magnetic field established between the first lock member 104A and the external electronic device magnetically couples the first lock member 104A to the external electronic device, and the magnetic field established between the second lock member 104B and the external electronic device magnetically couples the second lock member 104B to the external electronic device.

FIG. 2D is a perspective cross-sectional view of the connector 100 taken along line F-F of FIG. 2C. As shown, the side channels 110A, 110B each has a shape complementary to that of the side magnets 104A, 104B, to thereby allow the side magnets 104A, 104B to slide and rotate within the respective side channels 110A, 110B.

As will be appreciated, as the orientation angle θ of the side channels 110A, 110B increases, the sensor actuators 104 (side magnets 104A, 104B) will move farther away from the sides of the contact assembly 101 when the lock members 104 slide from the locked position to the unlocked position. The orientation angle θ may have a range of between 0 degrees and 90 degrees. Preferably, the orientation angle θ has a range of between 0 degrees and 20 degrees.

When the external electronic device is subsequently physically disengaged from the interface port 100, the magnetic field previously established between the core magnets 102 and the external electronic device no longer maintains the contact assembly 101 in the extended position. Similarly, the magnetic fields previously established between the lock members 104 and the external electronic device no longer maintain the lock members 104 in the unlocked position. As a result, the magnetic fields established between the lock members 104 and the contact assembly 101 urge the lock members 104 to slide, in their respective side channels 110A, 110B, away from the external face 16 of port/device housing and towards the first end of their respective side channels 110A, 110B, and laterally towards their respective sides of the contact assembly 101 due to the orientation angle θ of the side channels 110A, 110B. The lateral movement of the lock members 104 towards the sides of the contact assembly 101 strengthens the magnetic field therebetween, and urges the contact assembly 101 to slide in the center channel 112 away from the external face 16 of the port/device housing.

Where the lock members 104 comprise magnets, as the side magnets 104A, 104B slide towards the first end of their respective side channels 110A, 110B and laterally towards the their respective sides of the contact assembly 101, the side magnets 104A, 104B will rotate about their respective rotational axes into the first magnetic orientation, thereby further strengthening the magnetic field between the side magnets 104A, 104B and the contact assembly 101, and urging the contact assembly 101 to slide in the centre channel 112, away from the external face 16 of port/device housing.

The strengthening magnetic field between the lock members 104 and the contact assembly 10 will cause the lock members 104 to continue to slide, in their respective side channels 110A, 110B, towards the locked position, and laterally towards their respective sides of the contact assembly 101 due to the orientation angle θ of the side channels 110A, 110B, and thereby draw the contact assembly 101, in the centre channel 112, into the retracted position in which the contact assembly 101 is electrically isolated from the external electronic device. In this way, the magnetic field between the lock members 104 and the contact assembly 101, in conjunction with the orientation angle θ of the side channels 110A, 110B, biases the contact assembly 101 towards the retracted position without any mechanical (e.g., a spring) biasing being required.

When the lock members 104 reach the first end of their respective side channels 110A, 110B, the lock members 104 will have returned to the locked position and the contact assembly 101 will have returned to the retracted position in which the contact assembly 101 is electrically isolated from the external electronic device. The side magnets 104A, 104B will also have rotated about their respective rotational axes into the first magnetic orientation. In this position, the magnetic field strength between the lock members 104 and the contact assembly 101 is sufficient to maintain the contact assembly 101 in the retracted position. As will be apparent from the foregoing discussion, the side channels 110A, 110B are therefore configured such that the contact assembly 101 and the lock members 104 magnetically urge one another respectively into the retracted position and the locked position.

Figure 2F:
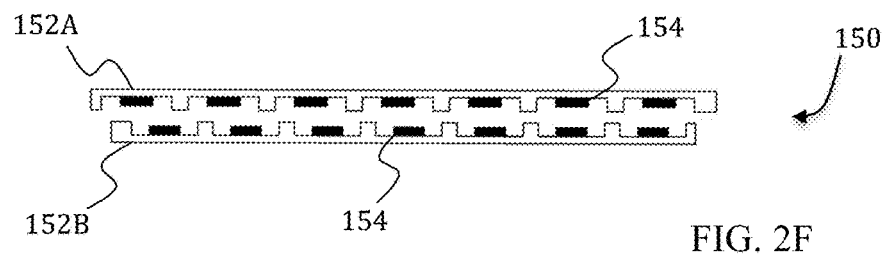
FIG. 2F is a side cross-sectional view of a motion sensor of the interface port.

FIG. 2F is a transverse cross-section view of one of the motion sensors 150 prior to being disposed in the respective side channel 110A, 110B. For ease of reference, in this embodiment the first side motion sensor 150 (and the second side motion sensor 150) will be collectively referred to as the side motion sensor 150, and the side channel 110A (and the side channel 110B) will be collectively referred to as the side channel 110.

As discussed above, each side channel 110 is oriented at an orientation angle θ away from the normal line of the exterior face 16 of the port/device. Therefore, the direction of movement of each lock member 104 relative to the interface port 100 is influenced by the orientation angle θ of the associated side channel 110. However, each lock member 104 is slidably moveable within the associated side channel 110 (between the locked position and the unlocked position) by the magnetic field that is established between the interface port 100 and the external device. Further, each side channel 110 may be configured to allow the associated lock member 104 to rotate (between the first and second magnetic orientations) as the lock member 104 slides between the locked position and the unlocked position. Therefore, preferably each side channel 110 is configured to have at least a clearance fit with the associated lock member 104 to facilitate the sliding (and optional rotational) movement of the lock member 104 within the associated side channel 110.

The clearance fit between each side channel 110 and the associated lock member 104 may also allow each lock member 104 to move relative to the associated side channel 110 in a direction that is influenced by the magnetic field that is established between the interface port 100 and the external device. The side motion sensor 150 is configured to detect the direction of movement of the lock member 104 relative to the interface port 100 (and optionally relative to the associated side channel 110), due to the magnetic field that is established between the interface port 100 and the external device. As will be explained, preferably the side motion sensor 150 is configured to detect the direction of movement of the lock member 104, due to the magnetic field, as the lock member 104 approaches the unlocked position.

Similarly, the contact assembly 101 is slidably moveable within the centre channel 112 (between the retracted position and the extended position) by the magnetic field that is established between the interface port 100 and the external device. Therefore, preferably the centre channel 112 is configured to have at least a clearance fit with the contact assembly 101 to facilitate the sliding movement of the contact assembly 101 within the associated centre channel 110. The clearance fit between the centre channel 112 and the contact assembly 101 may also allow the contact assembly 101 to move relative to the centre channel 110 in a direction that is influenced by the magnetic field that is established between the interface port 100 and the external device. The centre motion sensor 150 (as disposed in the centre channel 112) is configured to detect the direction of movement of the contact assembly 101 relative to the interface port 100 (and optionally relative to the centre channel 112), due to the magnetic field that is established between the interface port 100 and the external device. As will be explained, preferably the centre motion sensor 150 is configured to detect the direction of movement of the contact assembly 101, due to the magnetic field, as the contact assembly 101 approaches the extended position.

Figure 2G:
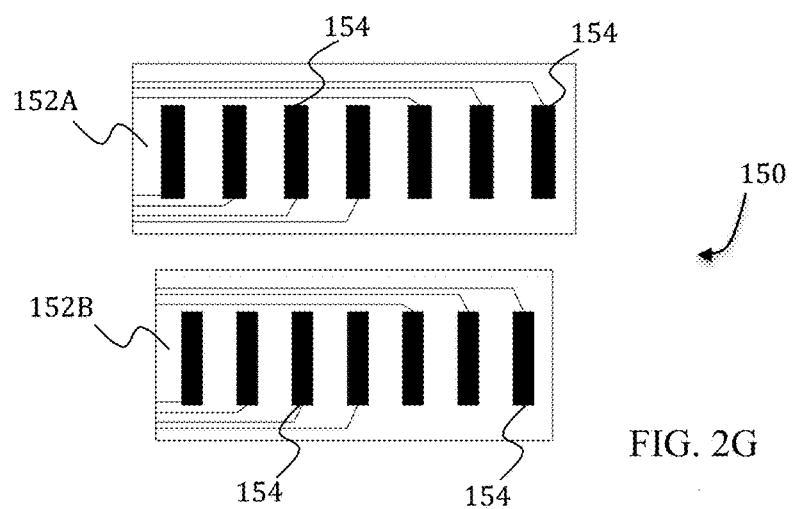
FIG. 2G is top plan view of the motion sensor depicted in FIG. 2F.

As shown in FIGS. 2F, 2G, the side motion sensor 150 may include a first sensor strip 152A and a second sensor strip 152B, disposed within the side channel 110 at the second end thereof. In this embodiment, the second end of the side channel 110 has an arcuate shape and, therefore, the sensor strips 152 are each arcuately-shaped when disposed in the second end of the side channel 110. However, the side channel 110 is not limited to this configuration. The second end of the side channel 110 may, for example, be substantially planar and, therefore, the sensor strips 152 may likewise be substantially planar.

The flexible sensor strips 152 each include a plurality of electrical contact pads 154 that are electrically isolated from each other on the respective sensor strip 152, but are electrically coupled to the communication sub-system 212. Accordingly, preferably the sensor strips 152A, 152B are each fabricated from a flexible printed circuit board. Further, the electrical contact pads 154 are disposed in an opposing orientation relative to each other such that, even though the flexible sensor strips 152 are arcuately-shaped when disposed at the second end of the side channel 110, each electrical contact pad 154 of the first sensor strip 152A is aligned with a respective electrical contact pad 154 of the second sensor strip 152B.

Accordingly, the flexible sensor strips 152 include a plurality of pairs of electrodes, each electrode pair comprising one of the electrical contact pads 154 of the first sensor strip 152A and the associated electrical contact pad 154 of the second sensor strip 152B. Since the sensor strips 152 are arcuately-shaped when disposed in the second end of the side channel 110, each electrode pair is disposed at a respective location within the side channel 110.

The electrical contact pads 154 in each flexible sensor strip 152 may be disposed below the surface of the respective printed circuit board, such that each electrical contact pad 154 of the first sensor strip 152A remains electrically isolated from the opposing electrical contact pad 154 of the second sensor strip 152B (at least until the associated lock member 104 impinges against the sensor strips 152, as will be described below). In one variation, not shown, the motion sensor 150 include flexible spacers disposed between the sensor strips 152 to maintain the aforementioned electrical isolation between the electrical pads 154. Alternately, the motion sensor 150 may be fabricated from a single multi-layer flexible printed circuit board.

The side motion sensor 150 is disposed at the second end of the side channel 110, between lock member 104 and the end-wall of the side channel 110. As discussed, the lock member 104 may comprise a permanent side magnet that is made from rare earth materials, iron, nickel or other suitable alloys. Alternately, the lock member 104 may comprise passive (e.g. metallic or ferromagnetic) magnetic materials. Accordingly, when the interface port 100 is remote from an external electronic device, the lock member 104 is urged into the locked position, away from the side motion sensor 150, by the magnetic field that is established between the lock member 104 and the contact assembly 101.

However, as discussed, when an external electronic device (for example the interface port 100 of another computing device 200) is brought into close proximity to the interface port 100, the magnetic field established between the external electronic device and the interface port 100 urges the lock member 104 to slide, in the side channel 110, from the first end of the side channel 110 towards the second end thereof (and to rotate about its rotational axis, from the first magnetic orientation into the second magnetic orientation, if the lock member 104 comprises a side magnet).

If the strength of the magnetic field established between the lock member 104 and the external electronic device is sufficient to overcome the magnetic field established between the lock member 104 and the contact assembly 101, the lock member 104 will slide towards the second end of the side channel 110 and laterally away from the side of the contact assembly 101, thereby weakening the magnetic field between the lock member 104 and the contact assembly 101.

When the magnetic field strength between the lock member 104 and the contact assembly 101 becomes insufficient to maintain the contact assembly 101 in the retracted position, the magnetic field established between the core magnets 102 and the external electronic device causes the contact assembly 101 to slide, in the centre channel 112, towards the external electronic device, and maintains the contact assembly 101 in the extended position in which the contact assembly 101 is in electrical contact with the external electronic device via the external electrical terminals 108.

As discussed, the clearance fit between the side channel 110 and the lock member 104 may allow the lock member 104 to move relative to the side channel 110 in a direction that is influenced by the magnetic field established between the external electronic device and the lock member 104. Therefore, when the lock member 104 reaches the second end of the side channel 110, the magnetic field established between the external electronic device and the lock member 104 magnetically couples the lock member 104 to the external electronic device, and the lock member 104 impinges against the flexible sensor strips 152 in a direction that is influenced by the magnetic field (i.e. due to the orientation angle θ of the side channel 110 and optionally also the orientation of the magnetic field relative to the side channel 110).

As the lock member 104 impinges against the flexible sensor strips 152, one or more of the electrical contact pads 154 of the first sensor strip 152A, that are disposed linearly between the lock member 104 and the external electronic device, become electrically connected with the opposing electrical contact pad(s) 154 of the second sensor strip 152B. The flexible sensor strips 152 output to the sensor monitor 216 a digital word identifying the opposing pairs of contact pads 154 that are connected together and the opposing pairs of contact pads 154 that are isolated from each other. In effect, therefore, the lock member 104 functions as a sensor actuator that impinges against the flexible sensor strips 152 and thereby reduces the impedance between the flexible sensor strips 152 upon the establishment of a magnetic field between the external electronic device and the interface port 100. However, the change in impedance is localized to the location of the electrode pair(s) at which the sensor actuator/lock member 104 impinges against the flexible sensor strips 152.

From the region over which the impedance between the flexible sensor strips 152 changes (i.e. from the digital word received from the sensor strips 152), the sensor monitor 216 determines the direction of movement of the sensor actuator/lock member 104 relative to the interface port 100 and optionally relative to the side channel 110 (as influenced by the magnetic field established between the external electronic device and the interface port 100). The sensor monitor 216 then determines the orientation of the external electronic device from the determined direction of movement of the sensor actuator/lock member 104.

Although the sensor monitor 216 was described above as being typically disposed within the device housing, the sensor monitor 216 may instead be disposed within the housing of the interface port 100, in which case the sensor monitor 216 may transmit the determined direction information to the data processing system 206 of the computing device 200.

In the foregoing embodiment, the side motion sensor 150 included a pair of opposing flexible sensor strips 152, comprising a plurality of electrode pairs, each disposed at a respective location within the side channel 110. However, the motion sensor 150 is not limited to this implementation.

In one variation (not shown), the side motion sensor 150 includes a plurality of piezo-resistive and/or piezo-electric sensors each disposed at a respective location within the side channel 110. In this embodiment, the sensor actuator/lock member 104 impinges against one of the piezo-resistive/piezo-electric sensors upon the influence of the magnetic field, and the one sensor outputs to the sensor monitor 216 a signal indicating the force exerted against the one sensor by the impinging sensor actuator/lock member 104. From the signal(s) received from the piezo-resistive/piezo-electric sensor(s), and the location of the sensor(s) within the side channel 110, the sensor monitor 216 determines the direction of movement of the sensor actuator/lock member 104 relative to the interface port 100 and optionally to the side channel 110 (as influenced by the magnetic field established between the external electronic device and the interface port 100).

In contrast to the sensor strips 152, however, each piezo-resistive/piezo-electric sensor outputs to the sensor monitor 216 an analog signal value indicative of the pressure exerted against the respective sensor by the sensor actuator/lock member 104. Therefore, the sensor monitor 216 may determine the direction of movement of the sensor actuator/lock member 104 through interpolation of the analog signal values received from the sensors. For example, if the side motion sensor 150 includes four piezo-resistive/piezo-electric sensors (e.g. sensor A, sensor B, sensor C, sensor D) equidistantly-spaced about the side channel 110, and sensors A, B, C, D, generate respective output signal values of 0.8 v, 0.8 v, 0 v, 0 v, the sensor monitor 216 may determine the direction of movement of the sensor actuator/lock member 104 to be on a line midway between the location of sensors A, B. The sensor monitor 216 then determines the orientation of the external electronic device from the determined direction of movement of the sensor actuator/lock member 104.

In another variation (not shown), the side motion sensor 150 includes a plurality of Hall effect sensors each disposed at respective locations within the side channel 110. In this latter embodiment, the sensor actuator/lock member 104 moves relative to one of the Hall effect sensors upon the influence of the magnetic field, and the one Hall effect sensor outputs to the sensor monitor 216 a signal indicating the movement of the sensor actuator/lock member 104. From the signal(s) received from the Hall effect sensor(s), and the orientation of the Hall effect sensor(s) within the side channel 110, the sensor monitor 216 determines the direction of movement of the sensor actuator/lock member 104 relative to the interface port 100 and optionally to the side channel 110 (as influenced by the magnetic field established between the external electronic device and the interface port 100). The sensor monitor 216 then determines the orientation of the external electronic device from the determined direction of movement of the sensor actuator/lock member 104.

In the foregoing embodiments, the side motion sensor 150 was disposed in the side channel 110 and was configured to detect the direction of movement of the sensor actuator/lock member 104 within the side channel 110. However, it should be understood that the interface port 100 is not so limited; the interface port 100 may also (or instead) include a centre motion sensor 150 that is disposed in the centre channel 112.

As shown in FIG. 2E, the leads 114 of the contact assembly 101 may be secured to the outward-facing side of the core magnets 102, facing the external electrical terminals 108, and exposed for electrical contact with the associated external electrical terminals 108. In one variation (not shown), the flexible sensor strips 152 of the centre motion sensor 150 are secured to the outward-facing side of the core magnets 102, and the leads 114 are secured to the outward-facing side of the flexible sensor strips 152, such that the flexible sensor strips 152 are disposed between the leads 114 and the outward-facing side of the core magnets 102.

In this embodiment, when an external electronic device (for example the interface port 100 of another computing device 200) is brought into close proximity to the interface port 100, the magnetic field established between the external electronic device and the interface port 100 urges the sensor actuator/lock member 104 to slide, in the side channel 110, from the first end of the side channel 110 towards the second end thereof, and laterally away from the side of the contact assembly 101.

If the strength of the magnetic field established between the lock member 104 and the external electronic device is sufficient to overcome the magnetic field established between the lock member 104 and the contact assembly 101, the lock member 104 will slide towards the second end of the side channel 110 and laterally away from the side of the contact assembly 101, thereby weakening the magnetic field between the lock member 104 and the contact assembly 101.

When the magnetic field strength between the lock member 104 and the contact assembly 101 becomes insufficient to maintain the contact assembly 101 in the retracted position, the magnetic field established between the core magnets 102 and the external electronic device causes the contact assembly 101 to slide, in the centre channel 112, towards the external electronic device, and maintains the contact assembly 101 in the extended position in which the contact assembly 101 is in electrical contact with the external electronic device via the external electrical terminals 108. When the lock member 104 reaches the second end of the side channel 110, the magnetic field established between the external electronic device and the lock member 104 magnetically couples the lock member 104 to the external electronic device.

As above, preferably the centre channel 112 is configured to have at least a clearance fit with the contact assembly 101 to facilitate the sliding movement of the contact assembly 101 within the centre channel 112. The clearance fit between the centre channel 112 and the contact assembly 101 may also allow the contact assembly 101 to move relative to the centre channel 112 in a direction that is influenced by the magnetic field established between the external electronic device and the contact assembly 101. Therefore, when the contact assembly 101 reaches the extended position, the magnetic field established between the external electronic device and the contact assembly 101 magnetically couples the contact assembly 101 to the external electronic device, and the contact assembly 101 impinges against the external electrical terminals 108 (or the corresponding electrical terminals of the external electronic device) in a direction influenced by the magnetic field (i.e. due to the orientation of the centre channel 112 and optionally also the orientation of the magnetic field relative to the centre channel 112).

As the contact assembly 101 impinges against the flexible sensor strips 152 of the centre motion sensor 150, one or more of the electrical contact pads 154 of the first sensor strip 152A that are disposed linearly between the contact assembly 101 and the external electronic device become electrically connected with the opposing electrical contact pad(s) 154 of the second sensor strip 152B. In effect, therefore, the contact assembly 101 functions as a sensor actuator that impinges against the flexible sensor strips 152 of the centre motion sensor 150 and thereby reduces the impedance between the flexible sensor strips 152 upon the establishment of a magnetic field between the external electronic device and the interface port 100. However, the change in impedance is localized to the location of the electrode pair(s) at which the contact assembly 101 impinges against the flexible sensor strips 152.

From the region over which the impedance between the flexible sensor strips 152 changes, the sensor monitor 216 determines the direction of movement of the contact assembly 101 relative to the interface port 100 and optionally relative to the centre channel 112 (as influenced by the magnetic field established between the external electronic device and the interface port 100). The sensor monitor 216 then determines the orientation of the external electronic device from the determined direction of movement of the contact assembly 101.

As will appreciated, instead of the contact assembly 101 including flexible sensor strips 152 disposed between the core magnets 102 and the leads 114, the contact assembly 101 may include piezo-resistive and/or piezo-electric sensors and/or Hall effect sensors disposed between the core magnets 102 and the leads 114. In these latter two embodiments, the sensor monitor 216 determines the direction of movement of the contact assembly 101 relative to the interface port 100 and optionally relative to the centre channel 112 (as influenced by the magnetic field established between the external electronic device and the interface port 100) from the signal(s) received from the sensors, and the location/orientation of the sensors within the centre channel 112. The sensor monitor 216 then determines the orientation of the external electronic device from the determined direction of movement of the contact assembly 101, as discussed above.

Interface Port with 3D Orientation Detection

In the foregoing embodiments, the side channel 110 (and/or the centre channel 112) is configured such that the sliding movement of the sensor actuator/lock member 104 within the side channel 110 (and/or the sliding movement of the contact assembly 101 within the centre channel 112) is restricted to a single plane. However, the invention is not limited to this configuration.

FIGS. 3A-3D depict an interface port 300 that is similar to interface port 100. However, instead of restricting movement of the sensor actuator/lock member (and the contact assembly) to a single plane, the interface port 300 allows for sliding movement of the sensor actuator/lock member and the contact assembly in two orthogonal planes (as influenced by the magnetic field established between the external electronic device and the interface port 300), and the motion sensor 150 may detect the direction of movement of the sensor actuator/lock member and the contact assembly within each of the two orthogonal planes.

In the embodiment of FIGS. 3A-3E, the interface port 300 includes a port/device housing, a contact assembly (comprising one or more core magnets 102), one or more lock members 104, and one or more motion sensors 250 (not shown in FIGS. 3A-3E) all disposed within the port/device housing. The port/device housing includes a centre channel 142, and at least one side channel 146 that is distinct from the centre channel 142.

The core magnets 102 of the interface port 300 correspond to the core magnets 102 of the interface port 100. However, in contrast to the centre channel 112 of the interface port 100, the centre channel 142 of the interface port 300 defines a first pathway that extends inwardly from a first window 134 formed in first face of the device housing, and a second pathway that extends inwardly from a second window 136 formed in a second face of the device housing. As shown, the first housing face that carries the first window 134 is orthogonal to the second housing face that carries the second window 136.

Figure 3A:
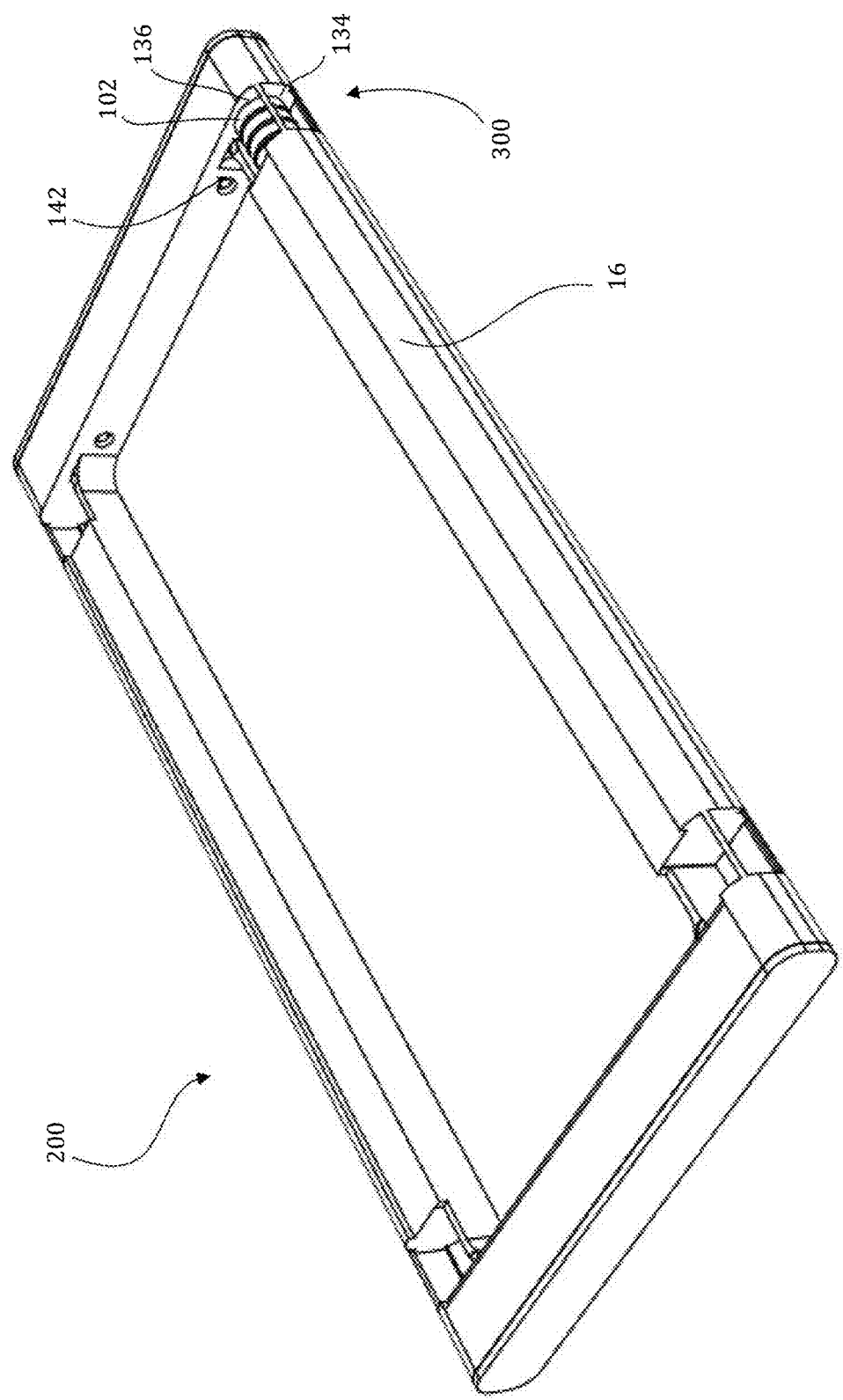
FIG. 3A is a perspective view of a computing device incorporating an interface port having 3D orientation sensitivity.
Figure 3B:
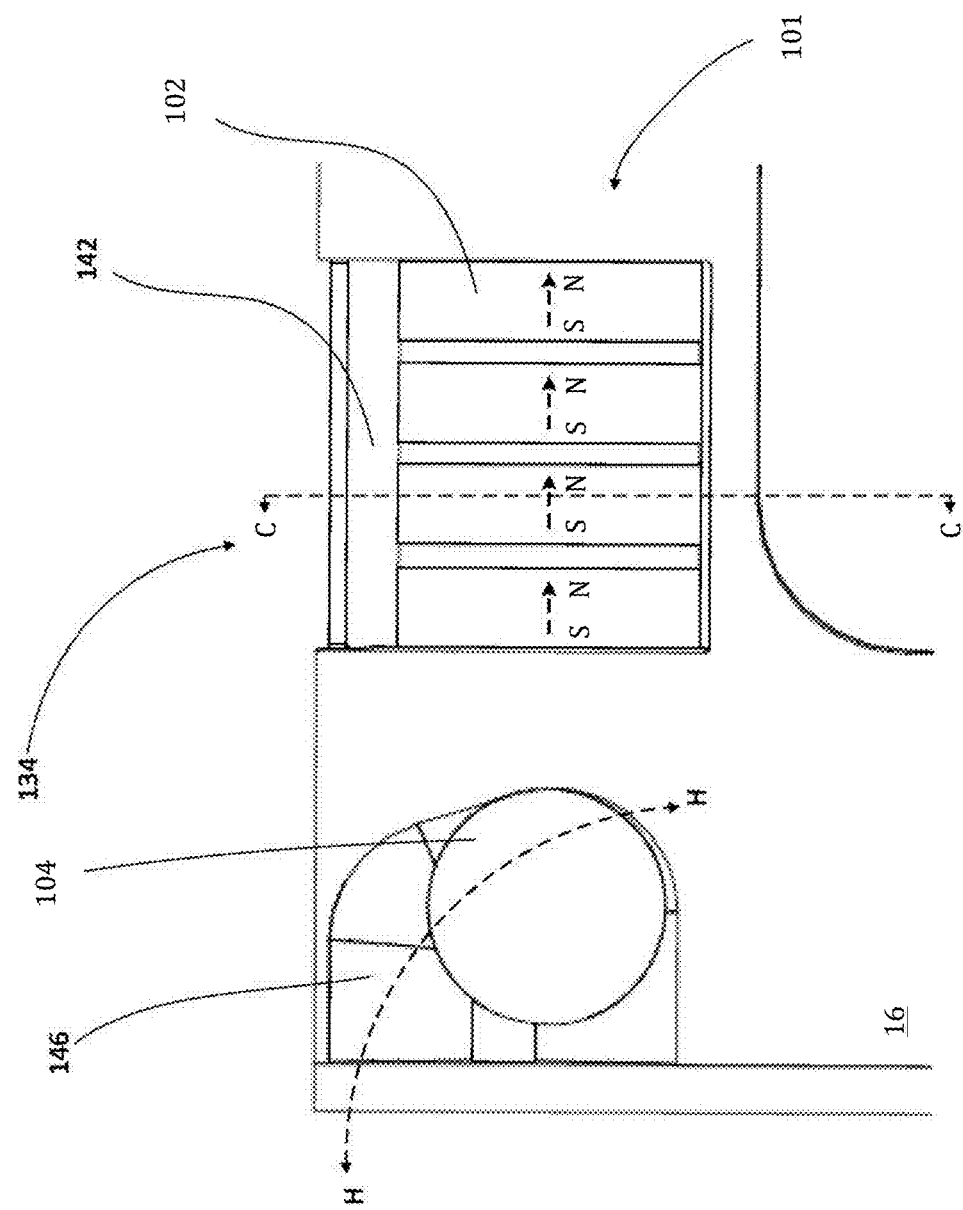
FIG. 3B is top cross-sectional view of the interface port of FIG. 3A, depicted in the retracted position.

The contact assembly of the interface port 300 may be urged to slide within the centre channel 142, in a direction that is influenced by the orientation of a magnetic field, relative to the interface port 300, that may be established between the interface port 300 and an external electronic device. Therefore, the contact assembly of the interface port 300 may be urged to slide within the first pathway of the centre channel 142, by a first magnetic field that may be established between the first window 134 and an external electronic device, between (i) a retracted position (as shown in FIG. 3B) in which the contact assembly is electrically isolated from the external electronic device, and (ii) a first extended position (as shown in FIG. 3D) in which the contact assembly is urged via the first magnetic field into the first window 134 and into electrical contact with the external electronic device. In the example shown in FIG. 3D, the external electronic device is another computing device 200.

Figure 3C:
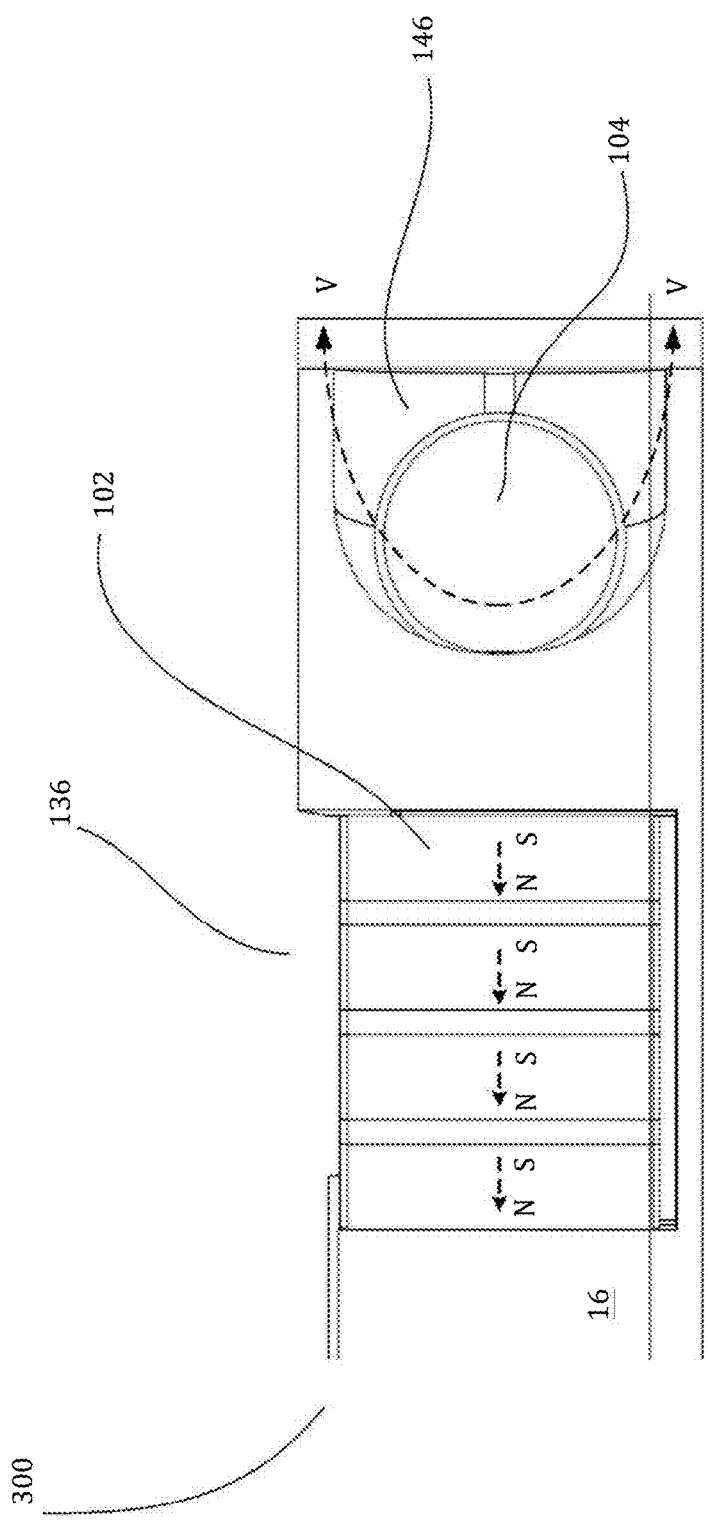
FIG. 3C is a side cross-sectional view of the interface port of FIG. 3A, depicted in the retracted position.
Figure 3D:
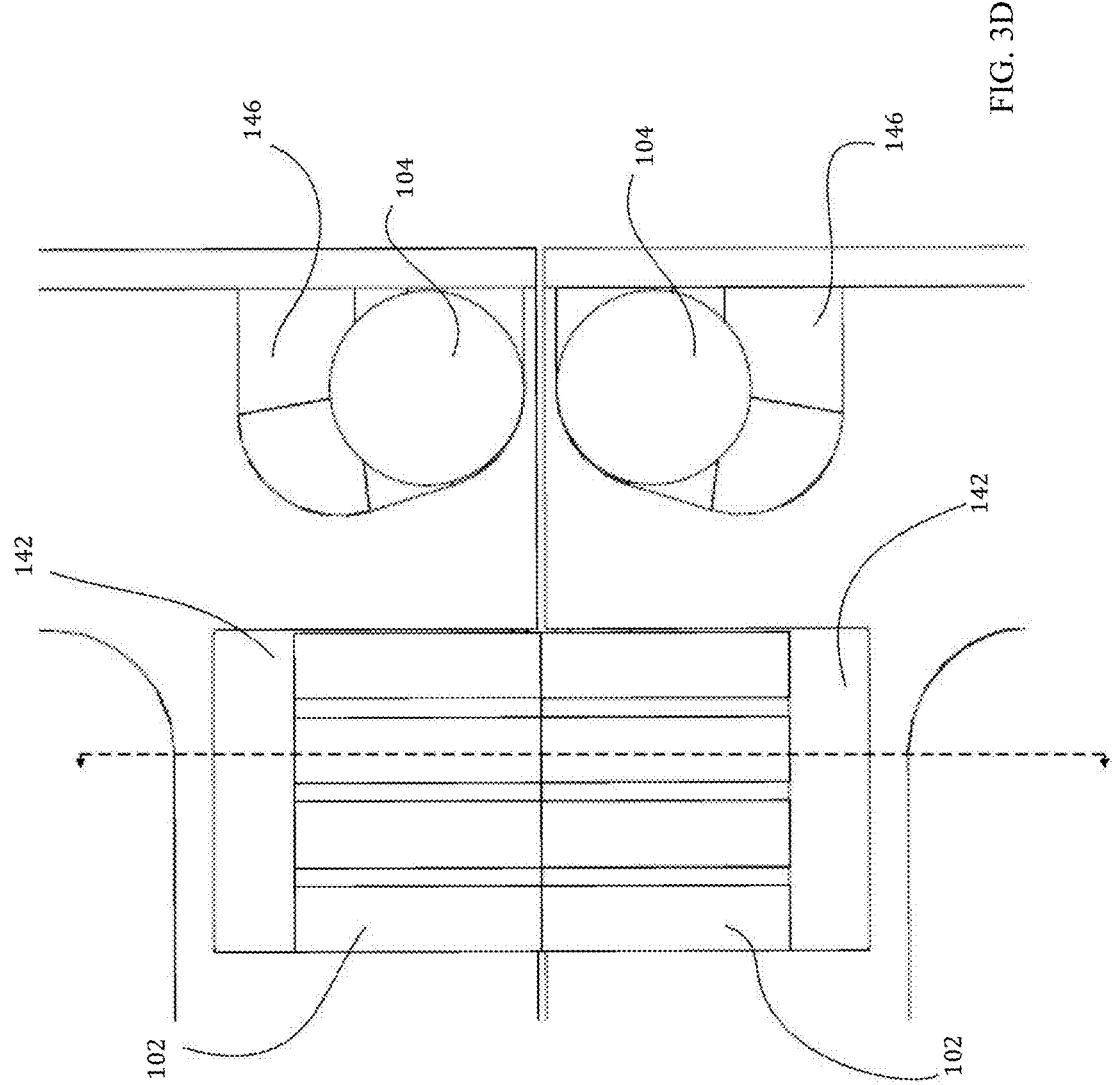
FIG. 3D is a side cross-sectional view of the interface port of FIG. 3B, depicted in the extended position.
Figure 3E:
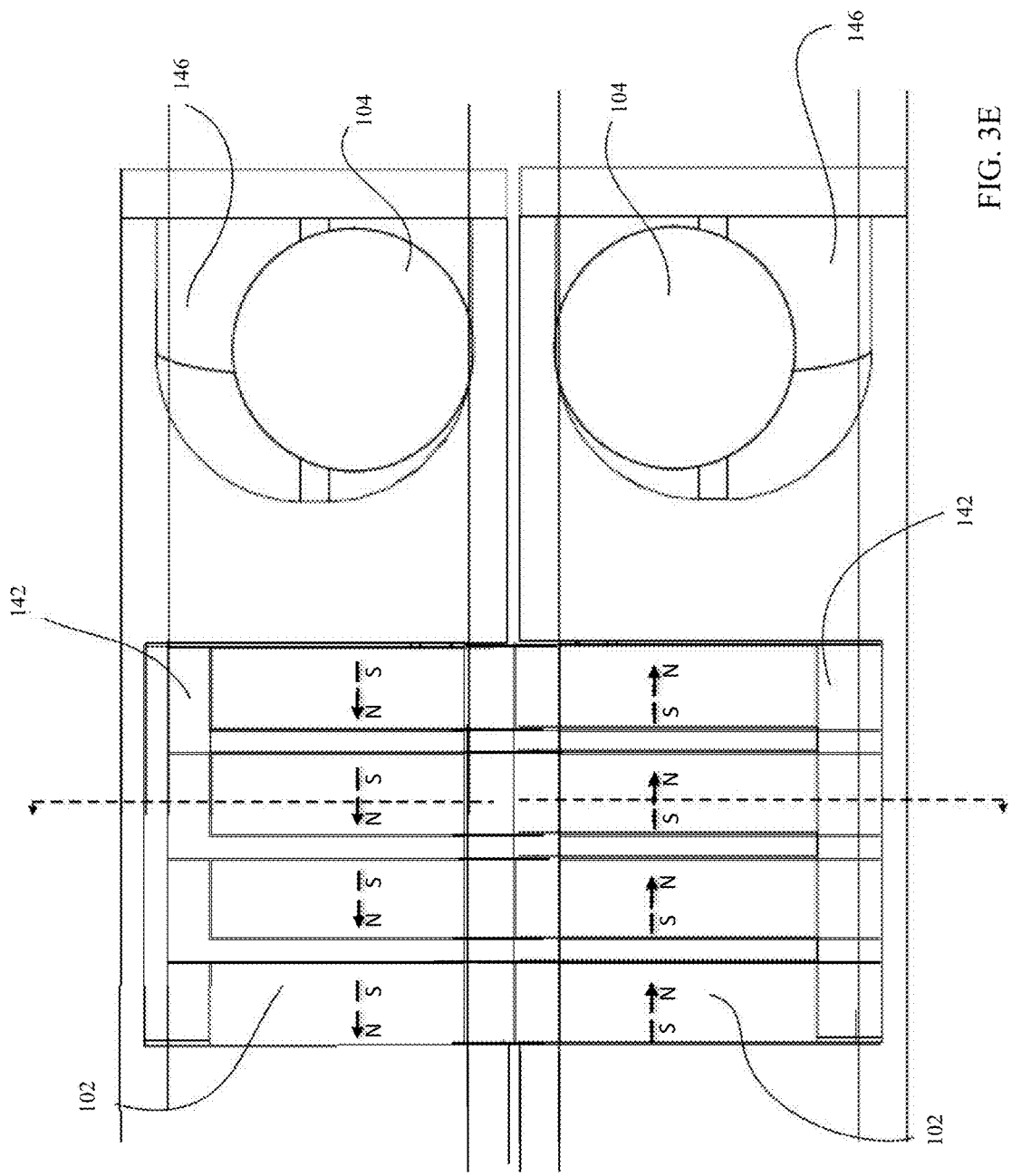
FIG. 3E is a side cross-sectional view of the interface port of FIG. 3C, depicted in the extended position.

The contact assembly of the interface port 300 may also be urged to slide within the second pathway of the centre channel 142, by a second magnetic field that may be established between the second window 136 and the external electronic device, between (i) the retracted position (as shown in FIG. 3C), and (ii) a second extended position (as shown in FIG. 3E) in which the contact assembly is urged via the second magnetic field, through the second window 136 and into electrical contact with the external electronic device. Since the first housing face is orthogonal to the second housing face, the first pathway of the centre channel 142 is orthogonal to the second pathway of the centre channel 142.

The lock member 104 of the interface port 300 corresponds to the lock member 104 of the interface port 100. However, in contrast to the side channel 110 of the interface port 100, the side channel 146 of the interface port 300 defines a first pathway H-H that extends inwardly from the first face of the device housing towards the centre channel 142, and a second pathway V-V that extends inwardly from the second face of the device housing towards the centre channel 142.

The lock member 104 may be urged to slide within the side channel 146, in a direction that is influenced by the orientation of a magnetic field, relative to the interface port 300, that may be established between the interface port 300 and an external electronic device. Therefore, the lock member 104 may be urged to slide within the first pathway H-H of the side channel 146, by a first magnetic field that may be established between the first housing face and the external electronic device, between (i) a locked position in which the lock member 104 is proximate the contact assembly and magnetically retains the contact assembly in the retracted position, and (ii) a first unlocked position in the first pathway in which the lock member 104 is urged via the first magnetic field towards the first housing face and laterally away from the contact assembly and releases the contact assembly from the retracted position.

The lock member 104 may also be urged to slide within the second pathway V-V of the side channel 146, by a second magnetic field that may be established between the second housing face and the external electronic device, between (i) the locked position, and (ii) a second unlocked position in the second pathway in which the lock member 104 is urged via the second magnetic field towards the second housing face and releases the contact assembly from the retracted position. Since the first housing face is orthogonal to the second housing face, the first pathway of the side channel 146 is orthogonal to the second pathway of the side channel 146.

Further, when the lock member 104 is in the locked position, the lock member 104 has a first magnetic orientation in which the magnetic field of the lock member 104 is aligned with the magnetic field of the contact assembly. Conversely, when the lock member 104 is in the first or second unlocked positions, the lock member 104 has a second magnetic orientation in which the magnetic field of the lock member 104 is at an acute angle relative to the magnetic field of the contact assembly.

The side motion sensor 250 of the interface port 300 corresponds to the side motion sensor 150 of the interface port 100. However, in contrast to the side motion sensor 150, the side motion sensor 250 may include a first pair of flexible sensor strips 152 disposed within the side channel 146, between the lock member 104 and the end-wall of the side channel 146 (proximate the first housing face), and a second pair of flexible sensor strips 152 disposed within the side channel 146, between the lock member 104 and the end-wall of the side channel 146 (proximate the second housing face).

When an external electronic device (for example the interface port 300 of another computing device 200) is brought into close proximity to the first window 134, a magnetic field is established between the external electronic device and the core magnets 102, and between the external electronic device and the lock member 104. The magnetic field urges the contact assembly to slide in the first pathway of the centre channel 142 towards the first window 134, and also urges the lock member 104 to slide within the first pathway H-H of the side channel 146 towards the first housing face and laterally away from the side of the contact assembly.

A clearance fit between the lock member 104 and the side channel 146 allows the lock member 104 to move within the side channel 146 in a direction that is influenced by the magnetic field established between the external electronic device and the lock member 104. Therefore, if the strength of the magnetic field established between the lock member 104 and the external electronic device is sufficient to overcome the magnetic field established between the lock member 104 and the contact assembly, the lock member 104 will begin to slide within the first pathway H-H towards the first housing face and laterally away from the side of the contact assembly, thereby weakening the magnetic field between the lock member 104 and the contact assembly. Where the lock member 104 comprises a magnet, as the side magnet 104 slides towards the first housing face and laterally away from the side of the contact assembly, the side magnet 104 will also rotate about its rotational axis from the first magnetic orientation into the second magnetic orientation, thereby further weakening the magnetic field between the side magnet 104 and the contact assembly until the magnetic field strength between the side magnet 104 and the contact assembly is insufficient to maintain the contact assembly in the retracted position.

A clearance fit between the contact assembly and the centre channel 142 allows the contact assembly to move within the centre channel 142 in a direction that is influenced by the magnetic field established between the external electronic device and the contact assembly. As a result, when the magnetic field strength between the lock member 104 and the contact assembly 101 becomes insufficient to maintain the contact assembly 101 in the retracted position, the magnetic field established between the core magnets 102 and the external electronic device causes the contact assembly to slide, in the first pathway of the centre channel 142, towards the first window 134, and maintains the contact assembly in the first extended position in which the contact assembly 101 is urged through the first window 134 and into electrical contact with the external electronic device. Similarly, the magnetic field established between the lock member 104 and the external electronic device maintains the lock member 104 in the first unlocked position. As a result, the magnetic field established between the lock member 104 and the external electronic device magnetically couples the lock member 104 to the external electronic device via the first housing face.

When the lock member 104 reaches the end-wall of the side channel 146 proximate the first housing face, the lock member 104 impinges against the flexible sensor strips 152. Since the lock member 104 is moveable within both the first pathway H-H of the side channel 146, and the second pathway V-V of the side channel 146, the direction of impingement is influenced by the orientation of magnetic field relative to the interface port 300.

As the lock member 104 impinges against the flexible sensor strips 152, the lock member 104 reduces the impedance between the flexible sensor strips 152. The change in impedance is localized to the location of the electrode pair(s) at which the lock member 104 impinges against the flexible sensor strips 152. From the region over which the impedance between the flexible sensor strips 152 changes, the sensor monitor 216 determines the direction of movement of the lock member 104 relative to the side channel 146 (as influenced by the magnetic field established between the external electronic device and the interface port 300). The sensor monitor 216 then determines the orientation of the external electronic device, relative to the interface port 300, from the determined direction of movement of the lock member 104.

On the other hand, when an external electronic device is brought into close proximity to the second window 136, the magnetic field established between the external electronic device and the core magnets 102, and between the external electronic device and the lock member 104, urges the contact assembly to slide in the second pathway of the centre channel 142 towards the second window 136, and also urges the lock member 104 to slide within the second pathway V-V of the side channel 146 towards the second housing face and laterally away from the side of the contact assembly.

As discussed, a clearance fit between the lock member 104 and the side channel 146 allows the lock member 104 to move within the side channel 146 in a direction that is influenced by the magnetic field established between the external electronic device and the lock member 104. Therefore, if the strength of the magnetic field established between the lock member 104 and the external electronic device is sufficient to overcome the magnetic field established between the lock member 104 and the contact assembly, the lock member 104 will begin to slide within the second pathway V-V towards the second housing face and laterally away from the side of the contact assembly, thereby weakening the magnetic field between the lock member 104 and the contact assembly. Where the lock member 104 comprises a magnet, as the side magnet 104 slides towards the second housing face and laterally away from the side of the contact assembly, the side magnet 104 will also rotate about its rotational axis from the first magnetic orientation into the second magnetic orientation, thereby further weakening the magnetic field between the side magnet 104 and the contact assembly until the magnetic field strength between the side magnet 104 and the contact assembly is insufficient to maintain the contact assembly in the retracted position.

As discussed, a clearance fit between the contact assembly and the centre channel 142 allows the contact assembly to move within the centre channel 142 in a direction that is influenced by the magnetic field established between the external electronic device and the contact assembly. As a result, when the magnetic field strength between the lock member 104 and the contact assembly 101 becomes insufficient to maintain the contact assembly 101 in the retracted position, the magnetic field established between the core magnets 102 and the external electronic device causes the contact assembly 101 to slide, in the second pathway of the centre channel 142, towards the second window 136, and maintains the contact assembly in the second extended position in which the contact assembly is urged through the second window 136 and into electrical contact with the external electronic device. Similarly, the magnetic field established between the lock member 104 and the external electronic device maintains the lock member 104 in the second unlocked position. As a result, the magnetic field established between the lock member 104 and the external electronic device magnetically couples the lock member 104 to the external electronic device via the second housing face.

When the lock member 104 reaches the end-wall of the side channel 146 proximate the second housing face, the lock member 104 impinges against the flexible sensor strips 152. Since the lock member 104 is moveable within both the first pathway H-H of the side channel 146, and the second pathway V-V of the side channel 146, the direction of impingement is influenced by the orientation of magnetic field relative to the interface port 300.

As the lock member 104 impinges against the flexible sensor strips 152, the lock member 104 reduces the impedance between the flexible sensor strips 152. The change in impedance is localized to the location of the electrode pair(s) at which the lock member 104 impinges against the flexible sensor strips 152. From the region over which the impedance between the flexible sensor strips 152 changes, the sensor monitor 216 determines the direction of movement of the lock member 104 relative to the side channel 146 (as influenced by the magnetic field established between the external electronic device and the interface port 300). The sensor monitor 216 then determines the orientation of the external electronic device, relative to the interface port 300, from the determined direction of movement of the lock member 104.

In one variation (not shown), the side motion sensor 250 includes a plurality of piezo-resistive and/or piezo-electric sensors each disposed at a respective location within the side channel 146. In this embodiment, the lock member 104 impinges against one of the sensors upon the influence of the magnetic field, and the one sensor outputs to the sensor monitor 216 a signal indicating the force exerted against the one sensor by the impinging lock member 104. From the signal(s) received from the sensor(s), and the location of the sensor(s) within the side channel 146, the sensor monitor 216 determines the direction of movement of the lock member 104 relative to the side channel 146. The sensor monitor 216 then determines the orientation of the external electronic device, relative to the interface port 300, from the determined direction of movement of the lock member 104.

In another variation (not shown), the side motion sensor 250 includes a plurality of Hall effect sensors each disposed at respective locations within the side channel 146. In this latter embodiment, the lock member 104 moves relative to one of the Hall effect sensors upon the influence of the magnetic field, and the one Hall effect sensor outputs to the sensor monitor 216 a signal indicating the movement of the lock member 104. From the signal(s) received from the Hall effect sensor(s), and the orientation of the Hall effect sensor(s) within the side channel 146, the sensor monitor 216 determines the direction of movement of the lock member 104 relative to the side channel 146. The sensor monitor 216 then determines the orientation of the external electronic device, relative to the interface port 300, from the determined direction of movement of the lock member 104.

In the foregoing embodiments, the motion sensor 250 was disposed in the side channel 146 and was configured to detect the direction of movement of the lock member 104 within the side channel 146. However, it should be understood that the interface port 300 is not so limited; the interface port 300 may also (or instead) include a centre motion sensor 250 that is disposed in the centre channel 142.

As above, the flexible sensor strips 152 of the centre motion sensor 250 may be secured to the outward-facing side of the core magnets 102, and the leads 114 may be secured to the outward-facing side of the flexible sensor strips 152, such that the flexible sensor strips 152 are disposed between the leads 114 and the outward-facing side of the core magnets 102. In this embodiment, when an external electronic device (for example the interface port 300 of another computing device 200) is brought into close proximity to the interface port 300, the magnetic field established between the external electronic device and the interface port 100 urges the lock member 104 to slide, in the side channel 146, laterally away from the side of the contact assembly.

A clearance fit between the centre channel 142 and the contact assembly allows the contact assembly to move relative to the centre channel 142 in a direction that is influenced by the magnetic field established between the external electronic device and the contact assembly. Therefore, the magnetic field also urges the contact assembly to slide, in the centre channel 142, from the retracted position towards the first or second extended position, as influenced by the magnetic field established between the external electronic device and the contact assembly.

When the contact assembly reaches the first or second extended position, the leads 114 electrically connect to the corresponding terminals of the external electronic device, and the contact assembly impinges against the flexible sensor strips 152 of the centre motion sensor 250. Since the contact assembly is moveable within both the first pathway of the centre channel 142, and the second pathway of the centre channel 142, the direction of impingement is influenced by the orientation of magnetic field relative to the interface port 300.

As the contact assembly impinges against the flexible sensor strips 152 of the centre motion sensor 250, the contact assembly reduces the impedance between the flexible sensor strips 152. The change in impedance is localized to the location of the electrode pair(s) at which the contact assembly impinges against the flexible sensor strips 152. From the region over which the impedance between the flexible sensor strips 152 changes, the sensor monitor 216 determines the orientation of the external electronic device as discussed above.

As will appreciated, instead of the contact assembly including flexible sensor strips 152 disposed between the core magnets 102 and the leads 114, the contact assembly may include piezo-resistive sensors and/or piezo-electric sensors and/or Hall effect sensors disposed between the core magnets 102 and the leads 114. In these latter two embodiments, the sensor monitor 216 determines the direction of movement of the contact assembly relative to the centre channel 142 (as influenced by the magnetic field established between the external electronic device and the interface port 300) from the signal(s) received from the sensors, and the location/orientation of the sensors within the centre channel 142. The sensor monitor 216 then determines the orientation of the external electronic device, relative to the interface port 300, from the determined direction of movement of the contact assembly, as discussed above.

Although the sensor monitor 216 is typically implemented by the data processing system 206 (or electronics hardware disposed within the housing of the computing device 200), all or a portion of the functionality of the sensor monitor 216 may instead be provided by the interface port 300. In this variation, for example, the interface port 300 may include electronics hardware that determines the orientation of the external electronic device and provides the orientation data to the data processing system 206.

Interface Port with Stationary Contact Assembly

In the foregoing embodiments, the contact assembly 101 is moveable within the centre channel 112/142 between the retracted position and the extended position, and the sensor actuator 104 releases the contact assembly 101 from the retracted position when an external computing device 200 is brought into proximity with the interface port 100/300. However, the invention is not limited to this configuration.

In one variation (not shown), the sensor actuator 104 slides within the side channel in response to the magnetic between the sensor actuator 104 and the external electronic device, as discussed above. However, in this variation the contact assembly 101 is not moveable within the centre channel 112/142, but is instead fixed (stationary) in the extended position in the centre channel 112/142. The sensor monitor 216 may determine the direction of movement of the sensor actuator 104 within the side channel, as discussed above. Alternately, the sensor monitor 216 may simply detect that the sensor actuator 104 has moved with the side channel from the "locked position" to the "unlocked position", in response to the magnetic field. The sensor monitor 216 may then determine that an external electronic device is proximate (or interfaced with) the interface port 100/300 (or proximate the housing of the computing device 200), from the detected movement (or direction of movement) of the sensor actuator 104.

Orientation Sensor

Thus far in this disclosure, the lock member (sensor actuator) has only been described as an element of an interface port for a computing device. However, the invention is not limited to this configuration.

FIGS. 4A-4F depict an orientation sensor 400 that may be disposed in the housing of a computing device 200. Similar to the interface ports 100/300, the orientation sensor 400 may be disposed at one or more corners of the housing of a computing device 200, along one or more sides of the device housing, and/or on the front and/or rear faces of the device housing, Further, as above, each orientation sensor 400 is connected to the communication sub-system 212 of the computing device 200.

As shown, the orientation sensor 400 includes a sensor actuator 404, a sensor housing 406, and a motion sensor 450. The sensor housing 406 includes an internal cavity provided therein; and the sensor actuator 404 and the motion sensor 450 are disposed within the internal cavity.

The internal cavity defines a channel 410 that extends from a second region of the surface of the internal cavity (second surface region) that is proximate to and located inwards from an exterior face of the device housing, and inwardly towards a first region of the surface of the internal cavity (first surface region) that is distal from the second surface region and the exterior surface of the device housing.

Figure 4A:
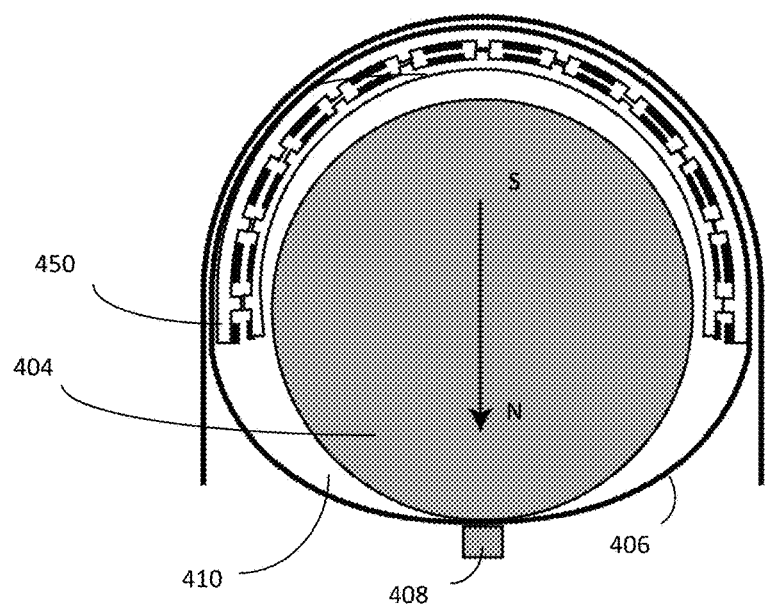
FIG. 4A is side cross-sectional view of the orientation sensor, depicted in the retracted position.
Figure 4B:
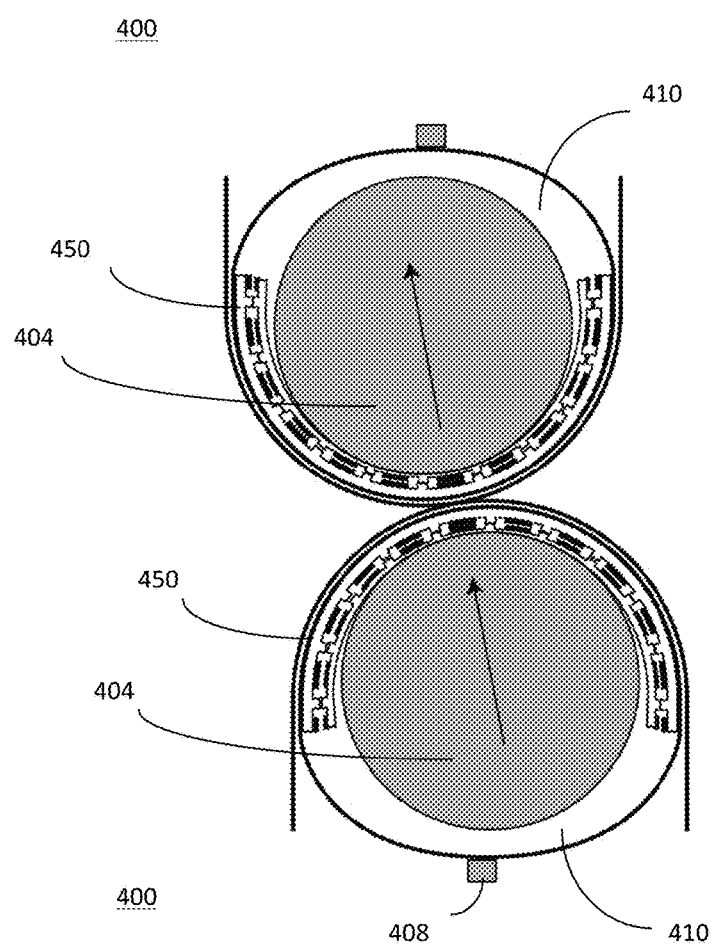
FIG. 4B is side cross-sectional view of the orientation sensor, depicted in the extended position.

Similar to the actuator/lock member 104 and the contact assembly 101, the sensor actuator 404 is configured for movement within the channel 410 in a direction that is influenced by a magnetic field between the sensor actuator 404 and an electric device that is external to the orientation sensor 400. Therefore, the sensor actuator 404 may be urged to move within the channel 410 by a magnetic field that may be established between the orientation sensor 400 and an electronic device that is external to the orientation sensor 400 and the device housing, and may move within the channel 410 in a direction that is influenced by the orientation of the magnetic field relative to the orientation sensor 400. As above, the sensor actuator 404 is moveable within the channel 410 between a retracted position (as shown in FIG. 4A) in which the sensor actuator 404 is proximate the first surface region, and an extended position (as shown in FIG. 4B) in which the sensor actuator 404 is urged via the magnetic field towards the second surface region and the electronic device.

To facilitate the movement of the sensor actuator 404 within the channel 410, the channel 410 is configured to have at least a clearance fit with the sensor actuator 404. Further, the sensor actuator 404 may comprise a permanent magnet. Preferably, the permanent magnet is made from rare earth materials, such as Neodymium-Iron-Boron (NdFeB), and Samarium-cobalt. The sensor actuator 404 may also be made from iron, nickel or other suitable alloys. Alternately, the sensor actuator 404 may be made from passive (e.g. metallic or ferromagnetic) magnetic materials.

The motion sensor 450 functionally corresponds to the motion sensor 150. Therefore, the motion sensor 450 is configured to detect the direction of movement of the sensor actuator 404 within the internal cavity, due to the magnetic field, as the sensor actuator 404 approaches the extended position.

The motion sensor 450 may include the aforementioned sensor strips 152, disposed within the channel 410, between the sensor actuator 404 and the second surface region of the channel 410. As above, the sensor strips 152 include a plurality of electrode pairs, and each electrode pair is disposed at a respective location within the second surface region of the channel 410.

Figure 4C:
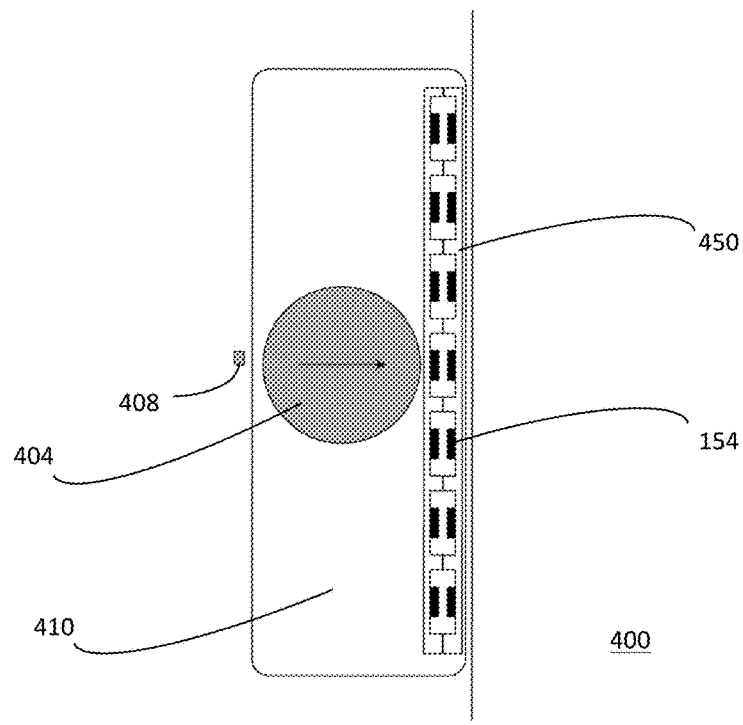
FIG. 4C is side cross-sectional view of a planar motion sensor of the orientation sensor.

In the embodiment of FIGS. 4A, 4B, the second surface region of the channel 410 has an arcuate shape and, therefore, the sensor strips 152 are each arcuately-shaped when disposed in the second surface region. However, the channel 410 is not limited to this configuration. As shown in FIG. 4C, the second surface region may, for example, be substantially planar and, therefore, the sensor strips 152 may likewise be substantially planar.

Figure 4D:
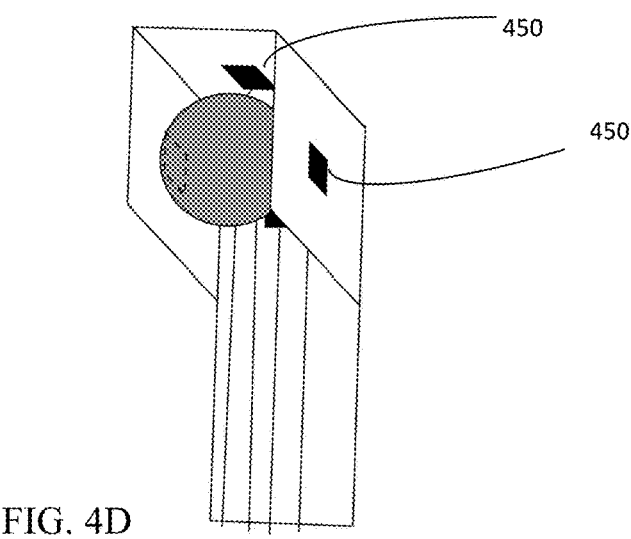
FIG. 4D is a perspective view of a 3D motion sensor.
Figure 4E:
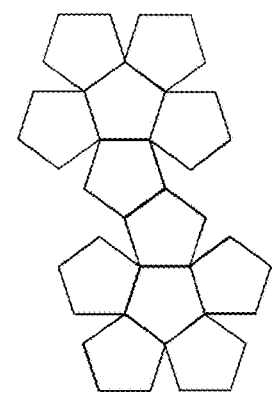
FIG. 4E is a plan view of multi-dimensional motion sensor, prior to being deployed in an orientation sensor.

Alternately, the second surface region may consist of multiple planar surfaces and, therefore, the motion sensor 450 may include a plurality of sensor faces each extending along a respective plane about the channel 410. The sensor faces of the motion sensor 450 may be disposed on orthogonal planes when installed in the channel 410, as shown in FIG. 4D, or may be disposed at an acute angle relative to each other, as shown in FIG. 4E. Although the sensor strip shown in FIG. 4E is substantially planar, the sensor strip will have a plurality of faces, each disposed at an acute angle relative to each other, when installed in the channel 410.

The orientation sensor 400 may also include a bias member 408 that is disposed externally to the sensor housing 406, proximate the first surface region of the channel 410. The bias member 408 biases the sensor actuator 404 away from the second surface region of the channel 410 when/until the sensor actuator 404 is exposed to a magnetic field between the sensor actuator 404 and an electronic device that is external to the orientation sensor 400. Therefore, where the sensor actuator 404 comprises a magnet, the bias member 408 may be a block member that is made from passive (e.g. metallic or ferromagnetic) magnetic materials. Alternately, where the sensor actuator 404 is made from passive (e.g. metallic or ferromagnetic) magnetic materials, the bias member 408 may be a permanent magnet.

As discussed, the sensor actuator 404 may comprise a permanent side magnet that is made from rare earth materials, iron, nickel or other suitable alloys. Alternately, the sensor actuator 404 may comprise passive (e.g. metallic or ferromagnetic) magnetic materials. Accordingly, when the orientation sensor 400 is remote from an external electronic device, the sensor actuator 404 is urged into the locked position, away from the motion sensor 150, by the magnetic field that is established between the sensor actuator 404 and the bias member 408 (if the orientation sensor 400 includes a bias member 408).

However, when an electronic device (for example the interface port 100/300 of another computing device 200) is brought into close proximity to the orientation sensor 400, the magnetic field established between the electronic device and the orientation sensor 400 urges the sensor actuator 404 to slide, in the channel 410, from the first surface region of the channel 410 towards the second surface region of the channel 410. If the strength of the magnetic field established between the sensor actuator 404 and the electronic device is sufficient to overcome the magnetic field established between the lock sensor actuator 404 and the bias member 408 (if included in the orientation sensor 400), the sensor actuator 404 will begin to slide towards the second surface region of the channel 410 in a direction that is influenced by the orientation of the magnetic field relative to the channel 410.

Figure 4F:
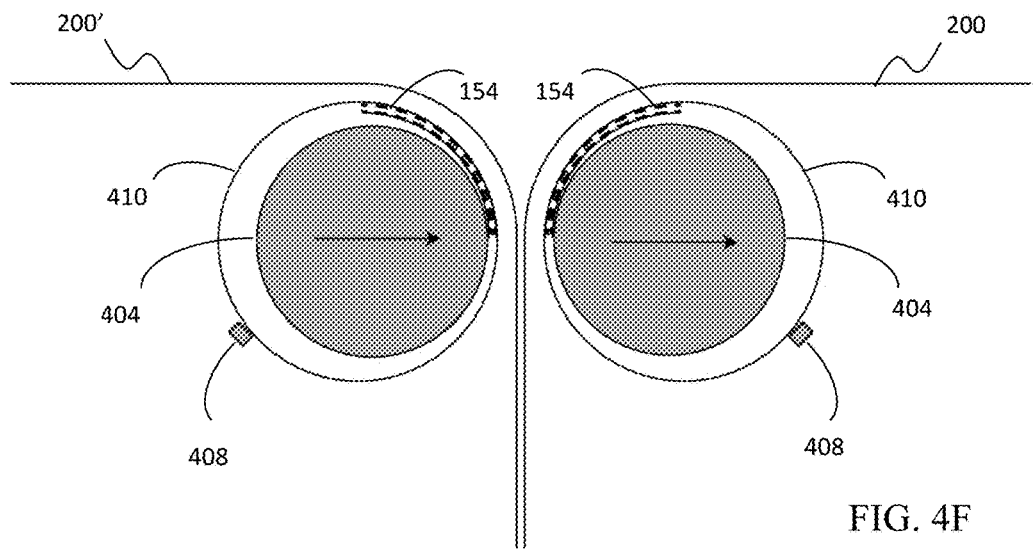
FIGS. 4F, 4G depict two possible orientations, and the associated magnetic field orientation, that two computing devices may have relative to each other.
Figure 4G:
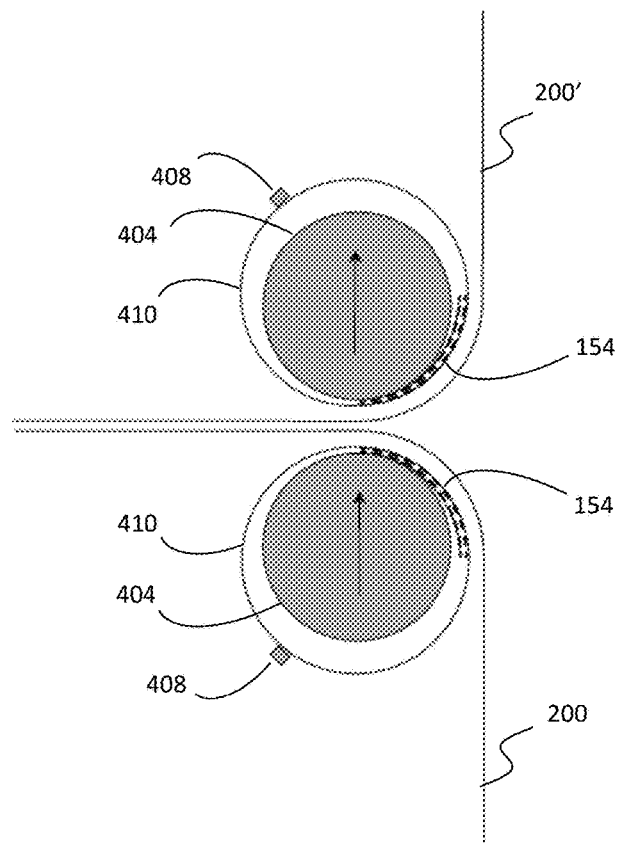

When the sensor actuator 404 reaches the second surface region of the channel 410, the sensor actuator 404 impinges against the flexible sensor strips 152 in a direction that is influenced by the orientation of the magnetic field relative to the channel 410. FIGS. 4F, 4G depict two possible orientations that two computing devices 200,200' may have relative to each other, and the associated magnetic field orientation, although the scope of possible orientations detected is not limited to those depicted therein.

As the sensor actuator 404 impinges against the flexible sensor strips 152, the sensor actuator 404 reduces the impedance between the flexible sensor strips 152 in a region that is localized to the region in which the sensor actuator 404 impinges against the flexible sensor strips 152. From the region over which the impedance between the flexible sensor strips 152 changes, the sensor monitor 216 determines the direction of movement of the sensor actuator 404 relative to the channel 410 (as influenced by the magnetic field established between the electronic device and the orientation sensor 400). The sensor monitor 216 then determines the orientation of the electronic device from the determined direction of movement of the sensor actuator 404.

As will appreciated, instead of the orientation sensor 400 including flexible sensor strips 152 disposed between within the channel 410, between the sensor actuator 404 and the second surface region of the channel 410, the orientation sensor 400 may include piezo-resistive sensors (such as Tekscan model FLX-A101-A) and/or piezo-resistive sensors and/or Hall effect sensors disposed between the sensor actuator 404 and the second surface region of the channel 410.

In these latter two embodiments, the sensor monitor 216 determines the direction of movement of the sensor actuator 404 relative to the channel 410 (as influenced by the magnetic field established between the electronic device and the orientation sensor 400) from the signal(s) received from the sensors, and the location/orientation of the sensors within the channel 410. The sensor monitor 216 then determines the orientation of the electronic device, relative to the orientation sensor 400, from the determined direction of movement of the sensor actuator 404.

Although the sensor monitor 216 was described above as being typically disposed within the device housing, the sensor monitor 216 may instead be disposed within the housing of the orientation sensor 400, in which case the sensor monitor 216 may transmit the determined direction information to the data processing system 206 of the computing device 200.

The invention claimed is:

1. An orientation sensor, comprising:
a sensor housing having a cavity disposed therein;
a sensor actuator disposed within the housing and configured for movement within the cavity in a direction influenced by a magnetic field between the sensor actuator and an electronic device external to the orientation sensor; and
a motion sensor configured to detect the direction of movement of the sensor actuator within the cavity, wherein the motion sensor comprises a plurality of piezo-resistive and/or piezo-electric sensors disposed at respective locations within the cavity, the sensor actuator is configured to impinge against at least one of the sensors upon the influence of the magnetic field, and the at least one sensor is configured to output a signal indicating a force exerted against the at least one sensor by the impinging.

2. The orientation sensor according to claim 1, wherein the cavity is configured to allow for the movement of the sensor actuator in two orthogonal planes, and the motion sensor is configured to detect the direction of movement of the sensor actuator within each of the two orthogonal planes.

3. The orientation sensor according to claim 1, wherein the motion sensor comprises a pair of opposed flexible sensor strips, the sensor actuator is configured to impinge against one of the sensor strips upon the influence of the magnetic field and to vary an impedance between the sensor strips upon the impinging, the impedance varying being localized to a location of the impinging.

4. The orientation sensor according to claim 3, wherein the pair of opposed sensor strips includes a plurality of sensor faces each extending along a respective plane about the cavity.

5. The orientation sensor according to claim 4, wherein the planes are orthogonal planes.

6. The orientation sensor according to claim 3, wherein each said flexible sensor strip includes a plurality of electrodes, the motion sensor comprises a plurality of pairs of the electrodes, each said pair of electrodes being disposed at a respective location within the cavity and consisting of one of the electrodes of the one sensor strip and a respective one of the electrodes of another of the sensor strips, and the sensor strips are configured to establish an electrical connection between at least one of the pairs of electrodes upon the impinging, the pairs of electrodes otherwise being electrically isolated from each other.

7. The orientation sensor according to claim 1, wherein the motion sensor comprises a plurality of Hall effect sensors disposed at respective locations within the cavity, the sensor actuator is configured to move relative to at least one of the Hall effect sensors upon the influence of the magnetic field, and the at least one Hall effect sensor is configured to output a signal indicating the movement of the sensor actuator.

8. A computing device, comprising:
a housing having a cavity disposed therein;
a sensor actuator disposed within the housing and configured for movement within the cavity in a direction influenced by a magnetic field between the sensor actuator and an electronic device external to the computing device;
a motion sensor disposed within the housing and configured to detect the direction of movement of the sensor actuator within the cavity; and
a sensor monitor coupled to the motion sensor and configured to determine an orientation of the electronic device relative to the housing from the detected direction of movement of the sensor actuator,
wherein the motion sensor comprises a plurality of piezo-resistive and/or piezo-electric sensors disposed at respective locations within the cavity, the sensor actuator is configured to impinge against one of the sensors upon the influence of the magnetic field, at least one of the sensors is configured to detect a force exerted against the at least one sensor by the impinging, and the sensor monitor is configured to determine the orientation of the electronic device from an output of the at least one sensor.

9. The computing device according to claim 8, wherein the cavity is configured to allow for the movement of the sensor actuator in two orthogonal planes, and the motion sensor is configured to detect the direction of movement of the sensor actuator within each of the two orthogonal planes.

10. The computing device according to claim 8, wherein the motion sensor comprises a pair of opposed flexible sensor strips, the sensor actuator is configured to impinge against one of the sensor strips upon the influence of the magnetic field and to vary an impedance between the sensor strips upon the impinging, the impedance varying being localized to a location of the impinging, and the sensor monitor is configured to determine the orientation of the electronic device from a location of the localized impedance varying.

11. The computing device according to claim 10, wherein the pair of opposed sensor strips includes a plurality of sensor faces each extending along a respective plane about the cavity.

12. The computing device according to claim 11, wherein the planes are orthogonal planes.

13. The computing device according to claim 8, wherein the motion sensor comprises a plurality of Hall effect sensors disposed at respective locations within the cavity, the sensor actuator is configured to move relative to one of the Hall effect sensors upon the influence of the magnetic field, the at least one Hall effect sensor is configured to detect the movement of the sensor actuator, and the sensor monitor is configured to determine the orientation of the electronic device from an output of the at least one Hall effect sensor.

14. An interface port for a computing device, comprising:
a port housing including a channel disposed therein;
a sensor actuator disposed in the port housing and configured for movement within the channel in response to a magnetic field between the sensor actuator and an electronic device external to the interface port;
a contact assembly disposed in the port housing and fixed in a position therein in which the contact assembly is exposed for electrical contact with the external electronic device; and
a motion sensor configured to detect the movement of the sensor actuator within the channel,
wherein the motion sensor comprises a plurality of piezo-resistive and/or piezo-electric sensors disposed at respective locations within the channel, the sensor actuator is configured to impinge against at least one of the sensors upon influence of the magnetic field, and the at least one sensor is configured to output a signal indicating a force exerted against the at least one sensor by the impinging.

15. The interface port according to claim 14, wherein the channel is configured to restrict the movement of the sensor actuator to a single plane.

16. The interface port according to claim 14, wherein the channel is configured to allow for the movement of the sensor actuator in two orthogonal planes, and the motion sensor is configured to detect the direction of movement of the sensor actuator within each of the two orthogonal planes.

17. The interface port according to claim 14, wherein the motion sensor comprises a pair of opposed flexible sensor strips, the sensor actuator is configured to impinge against one of the sensor strips upon the influence of the magnetic field and to vary an impedance between the sensor strips upon the impinging, the impedance varying being localized to a location of the impinging.

18. The interface port according to claim 17, wherein the pair of opposed sensor strips includes a plurality of sensor faces each extending along a respective plane about the channel.

19. The interface port according to claim 18, wherein the planes are orthogonal planes.

20. The interface port according to claim 17, wherein each said flexible sensor strip includes a plurality of electrodes, the motion sensor comprises a plurality of pairs of the electrodes, each said pair of electrodes being disposed at a respective location within a secondary channel and consisting of one of the electrodes of the one sensor strip and a respective one of the electrodes of another of the sensor strips, and the sensor strips are configured to establish an electrical connection between at least one of the pairs of electrodes upon the impinging, the pairs of electrodes otherwise being electrically isolated from each other.

21. The interface port according to claim 14, wherein the motion sensor comprises a plurality of Hall effect sensors disposed at respective locations within the channel, the sensor actuator is configured to move relative to at least one of the Hall effect sensors upon the influence of the magnetic field, and the at least one Hall effect sensor is configured to output a signal indicating the movement of the sensor actuator.

\* \* \* \* \*